United States Patent
Buer

(10) Patent No.: US 9,806,433 B2
(45) Date of Patent: Oct. 31, 2017

(54) PARTITIONED PHASED ARRAY FED REFLECTOR ANTENNA SYSTEM

(71) Applicant: VIASAT, INC., Carlsbad, CA (US)

(72) Inventor: Kenneth V Buer, Gilbert, AZ (US)

(73) Assignee: VIASAT, INC., Carlsbad, CA (US)

( * ) Notice: Subject to any disclaimer, the term of this patent is extended or adjusted under 35 U.S.C. 154(b) by 934 days.

(21) Appl. No.: 13/841,256

(22) Filed: Mar. 15, 2013

(65) Prior Publication Data

US 2015/0255883 A1 Sep. 10, 2015

(51) Int. Cl.
  *H01Q 25/00* (2006.01)
  *H04B 7/204* (2006.01)
  *H01Q 1/28* (2006.01)

(52) U.S. Cl.
  CPC .......... *H01Q 25/007* (2013.01); *H01Q 1/288* (2013.01); *H04B 7/2041* (2013.01)

(58) Field of Classification Search
  CPC ...... H01C 25/007; H01C 1/288; H01C 15/14; H04B 7/2041; H04B 7/0691; H04B 7/0874
  See application file for complete search history.

(56) References Cited

U.S. PATENT DOCUMENTS

| | | | | |
|---|---|---|---|---|
| 4,755,826 A | * | 7/1988 | Rao | H01Q 19/192 343/781 P |
| 5,598,173 A | * | 1/1997 | Lo Forti | H01Q 3/26 342/372 |
| 6,011,512 A | * | 1/2000 | Cohen | H01Q 1/288 342/354 |
| 6,246,364 B1 | * | 6/2001 | Rao | H01Q 1/288 342/368 |
| 6,272,317 B1 | | 8/2001 | Houston et al. | |
| 6,999,044 B2 | * | 2/2006 | Durham | H01Q 3/2658 343/753 |

(Continued)

FOREIGN PATENT DOCUMENTS

| | | |
|---|---|---|
| EP | 0963005 A2 | 12/1999 |
| EP | 1191628 A1 | 3/2002 |
| EP | 2779306 A1 | 9/2014 |

OTHER PUBLICATIONS

Extended European Search Report mailed in European Patent Application No. 14158223.9 on Jul. 1, 2014, 8 pgs.

*Primary Examiner* — Cassie Galt
(74) *Attorney, Agent, or Firm* — Fountainhead Law Group P.C.

(57) ABSTRACT

Systems and methods for partitioned phased array fed (PAFR) antennas with improved throughput capacity are disclosed. The phased array in a PPAFR antenna is partitioned into multiple partitions of antenna elements that can be operated by corresponding beam forming networks with reduce sized, weight, and power consumption characteristics to independently and simultaneously to generate angularly offset static and dynamic spot beams patterns. The independently generated spot beam patterns can be configured to include transmission and receiving spot beams for establishing a number of pathways. Accordingly, the number of pathways a particular partitioned PAFR antenna system can support relative to an unpartitioned PAFR antenna system can be increased while also using smaller and lighter configurations of beam forming networks.

47 Claims, 18 Drawing Sheets

(56) References Cited

U.S. PATENT DOCUMENTS

| | | | |
|---|---|---|---|
| 7,034,753 B1 * | 4/2006 | Elsallal | H01Q 21/0006 343/700 MS |
| 7,180,447 B1 * | 2/2007 | Jacomb-Hood | H01Q 3/24 342/373 |
| 7,423,578 B1 * | 9/2008 | Tietjen | G01S 7/03 342/157 |
| 2010/0117893 A1 | 5/2010 | Dreher et al. | |

* cited by examiner

PARTITIONED PHASED ARRAY FED REFLECTOR ANTENNA SYSTEM

BACKGROUND

The present invention relates to satellite communications, and in particular, to partitioned phased array antenna communication systems with improved throughput capacity and reduced weight, size, and power consumption.

Unless otherwise indicated herein, the approaches described in this section are not prior art to the claims in this application and are not admitted to be prior art by inclusion in this section.

Phased array antennas are capable of steering transmission and reception beams over a small field of view. The ability of phased arrays to steer beams makes them suitable for relay communication systems in which multiple pathways between multiple locations are created (e.g., pathways between an internet service provider gateway and user terminals). The directivity of a phased array antenna is largely determined by the number of antenna elements in the phased array. The better the directivity with which the beams can be steered allows for greater throughput because beams that might otherwise interfere with one another can be physically separated. Two beams with the same or overlapping carrier frequencies or polarizations can be directed toward two geographically isolated regions to avoid interference.

Adding a reflector, such as a parabolic reflector, to the phased array antenna can increase the directivity of the antenna without increasing the number of phased array elements. Phased array antennas configured with reflectors are often referred to as phased array fed reflector (PAFR) antennas. The increase in directivity afforded by PAFR antennas without the addition of size, weight and power consumption associated with additional antenna elements and the underlying beam forming hardware is particularly useful in size, weight, and power constrained devices and systems. For example, the payload and power capacities of satellites used in satellite communication systems are inherently limited. The directivity of a PAFR antenna in a satellite can provide for improved geographic separation of beams. The larger geographic separation of beams provides for increased frequency spectrum reuse and, therefore, increased throughput capacity.

Even with the use of PAFR antennas, the payload and power constraints on the capabilities of phased array antenna satellite communication systems directly impact such systems' data throughput capacity. In a conventional PAFR antenna satellite communication system, the beam forming hardware of the phased array can account for more than two-thirds of the antenna system's size and mass and about a fifth of the system's the power consumption. However, much of the phased array is underutilized or unutilized when the PAFR antenna is aimed off center. Off center beams are typically referred to as being "off bore-sight". For off bore-sight beams that are directed a few degrees off center, a PAFR antenna might use at little as two-thirds of the antenna elements and beam forming hardware in the array. Accordingly, for many of the beams that a PAFR antenna system is capable of forming, much of the system's hardware is unused. The underutilization of beam forming hardware contributes to size, weight and power consumption based limitations on throughput capacity in satellite communication systems. Throughput capacity limitations contribute to the difficulty satellite communication systems have when competing with other communication and data delivery methods (e.g., digital subscriber lines (DSL), cable, WiMax, etc.). What is needed is a system and method for a phased array antenna that allows for increased throughput capacity without increasing weight, size, or power consumption.

SUMMARY

Embodiments of the present invention improve PAFR antenna systems. In one embodiment, the present disclosure includes a method comprising: generating a first plurality of spot beams using a first partition of antenna elements in an array of antenna elements in a phased array fed reflector antenna, and simultaneously generating a second plurality of spot beams using a second partition of antenna elements in the array of antenna elements in the PAFR antenna. In one embodiment, the first plurality of spot beams and the second plurality of spot beams are reflected off a reflector of the phased array fed reflector antenna and directed toward a first location and a second location. The first location and the second location can completely or partially spatially separate from one another.

In one embodiment of such a method, the first plurality of spot beams utilize a frequency spectrum, and wherein the second plurality of spot beams utilize at least a portion of the same frequency spectrum.

In one embodiment of such a method, the first partition or the second partition of antenna elements may be contiguous in the array of antenna elements.

In one embodiment of such a method, the first plurality of spot beams and second plurality of spot beams can be angularly offset from one another.

In one embodiment of such a method, the first plurality of spot beams may include a first plurality of transmission beams and a first plurality of receiving beams, and the second plurality of spot beams may include a second plurality of transmission beams and a second plurality of receiving beams.

In another embodiment, such a method can further include establishing a first pathway comprising at least one of the first plurality of transmission beams and at least one of the first plurality of receiving beams.

In another embodiment, such a method can further include establishing a first pathway that includes at least one of the first plurality of transmission beams and at least one of the second plurality of receiving beams.

In one embodiment of such a method, the first partition of antenna elements may include at least one antenna element in the second partition of antenna elements.

In another embodiment, the present disclosure includes a satellite comprising: a reflector, an array of antenna elements, the array of antenna elements comprising a plurality of partitions of antenna elements and disposed relative to a focal point of the reflector, and a plurality of corresponding beam forming networks coupled to the plurality of partitions of antenna elements, the plurality of beam forming networks configured to provide signals to the plurality of partitions of antenna elements to generate a plurality of simultaneous spot beam patterns.

In one embodiment of such a satellite, the plurality of simultaneous spot beam patterns utilizes at least a portion of a common frequency spectrum.

In one embodiment of such a satellite, at least some of the plurality of partitions of antenna elements may include at least one common antenna element, wherein the at least on common antenna element is included in more than one of the plurality of partitions of antenna elements.

In one embodiment of such a satellite, at least some of the plurality of partitions of antenna elements may include contiguous antenna elements.

In one embodiment of such a satellite, the plurality of simultaneous spot beam patterns may include a plurality of transmission spot beams and a plurality of receiving spot beams.

In one embodiment of such a satellite, the plurality of beam forming networks can be further configured to establish a plurality of pathways, wherein each of the pathways can include at least one of the plurality of transmission spot beams and at least one of the plurality of receiving spot beams.

In another embodiment, the present disclosure includes a system comprising: a plurality of terminals, and an antenna system: a reflector, an array of antenna elements, the array of antenna elements comprising a plurality of partitions of antenna elements and disposed relative to focal point of the reflector, and a plurality of corresponding beam forming networks coupled to the plurality of partitions of antenna elements and configured to provide signals to the plurality of partitions of antenna elements to generate a plurality of simultaneous spot beam patterns, wherein the plurality of simultaneous spot beam patterns are configured to transmit signals among the plurality of terminals.

In one embodiment of such a system, each of the plurality of simultaneous spot beam patterns may include a frequency spectrum common to at least some of the plurality of simultaneous spot beam patterns.

In one embodiment of such a system, the plurality of partitions of antenna elements may include contiguous antenna elements.

In one embodiment of such a system, at least two of the plurality of partitions of antenna elements may include at least one common antenna element.

In one embodiment of such a system, the plurality of terminals are disposed in a plurality of corresponding geographic regions, and wherein each of the plurality of simultaneous spot beam patterns is directed toward one of the corresponding geographic regions.

In one embodiment of such a system, the antenna system is disposed in a satellite in an orbit.

The following detailed description and accompanying drawings provide a better understanding of the nature and advantages of the present invention.

DETAILED DESCRIPTION

Described herein are techniques for partitioned phased array fed reflector (PPAFR) antennas and PPAFR antenna equipped communication satellites and systems. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

The present disclosure provides for systems and methods for PPAFR antennas and PPAFR antenna equipped satellite communication systems with improved throughput capacity. The phased array in a PPAFR antenna is partitioned into multiple partitions, or regions, of antenna elements that can be operated independently and simultaneously to generate angularly offset static and dynamic patterns of spot beams. Each individual spot beam in the patterns of spot beams can be targeted independently. For example, individual spot beams originating from a PPAFR antenna equipped satellite can be aimed at desired areas across the given partition's geographic coverage area (e.g., high density population areas in a specific region of the North America). Each antenna element in the PPAFR antenna is supported by as reduced size and weight beam forming circuit or beam forming network. Accordingly, the number of pathways a particular PPAFR antenna equipped communication system can support can be increased while maintaining, or even reducing, the size, weight, and power consumption of that PPAFR antenna.

Satellite Communication Systems

Figure 1:
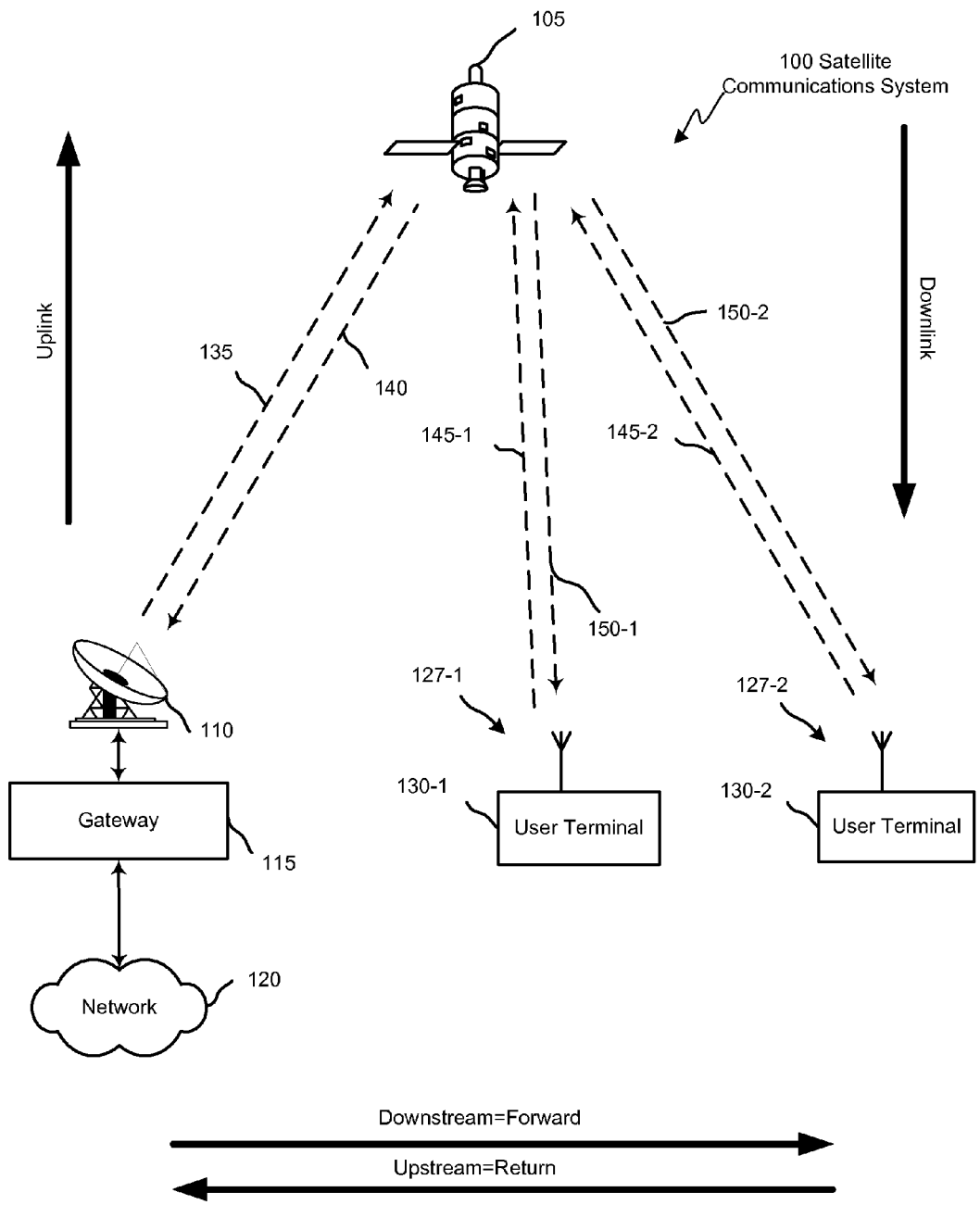
FIG. 1 illustrates a block diagram of a satellite communication system that can be improved by various embodiments of the present disclosure.

FIG. 1 is a diagram of an example satellite communications system 100 in which the systems, methods, and devices disclosed herein may be implemented. Satellite communication system 100 includes a network 120 interfaced with one or more gateway terminals 115. GW terminal 115 is configured to communicate with one or more user terminals 130 via satellite 105. As used herein the term "communicate" refers to either transmitting or receiving (i.e. unidirectional communication) over a particular pathway.

Gateway terminal 115 is sometimes referred to herein as the hub or ground station. Gateway terminal 115 services uplink 135 and downlink 140 to and from satellite 105. Gateway terminal 115 may also schedule traffic to user terminals 130. Alternatively, the scheduling may be performed in other parts of satellite communication system 100. Although only one gateway terminal 115 is shown in FIG. 1 to avoid over complication of the drawing, embodiments of the present disclosure may be implemented in satellite communication systems having multiple gateway terminals 115, each of which may be coupled to each other and/or one or more networks 120. In most satellite communication systems, the available frequency spectrum is limited. Communication links between gateway terminal 115 and satellite 105 may use the same, overlapping, or different frequencies as communication links between satellite 105 and user terminals 130. Gateway terminal 115 may also be located remotely from user terminals 130 to enable frequency reuse. By separating the gateway terminal 115 and user terminals 130, spot beams with common frequency bands can be geographically separated to avoid interference.

Network 120 may be any type of network and can include for example, the Internet, an IP network, an intranet, a wide area network (WAN), a local area network (LAN), a virtual private network (VPN), a virtual LAN (VLAN), a fiber optic network, a cable network, a public switched telephone network (PSTN), a public switched data network (PSDN), a public land mobile network, and/or any other type of network supporting communications between devices as described herein. Network 120 may include both wired and wireless connections as well as optical links. Network 120 may connect gateway terminal 115 with other gateway terminals that may be in communication with satellite 105 or with other satellites.

Gateway terminal 115 may be provided as an interface between network 120 and satellite 105. Gateway terminal 115 may be configured to receive data and information directed to one or more user terminals 130. Gateway terminal 115 may format the data and information for delivery to respective terminals 130. Similarly gateway terminal 115 may be configured to receive signals from satellite 105 (e.g., from one or more user terminals 130) directed to a destination accessible via network 120. Gateway terminal 115 may also format the received signals for transmission on network 120. Gateway terminal 115 may use antenna 110 to transmit forward uplink signal 135 to satellite 105. In one embodiment, antenna 110 may comprise a parabolic reflector with high directivity in the direction of satellite 105 and low directivity in other directions. Antenna 110 may comprise a variety of alternative configurations include operating features such as high isolation between orthogonal polarizations, high-efficiency in the operational frequency band, low noise, and the like.

Satellite 105 may be a geostationary satellite that is configured to receive forward uplink signals 135 from the location of antenna 110. Satellite 105 may use, for example, a reflector, a phased array antenna, an antenna, or other mechanisms known in the art for reception of such signals. Satellite 105 may receive the signals 135 from gateway terminal 115 and forward corresponding downlink signals 150 to one or more of user terminals 130. The signals may be passed through a transmit reflector antenna (e.g., a PAFR antenna) to form the transmission radiation pattern (e.g., a spot beam). Satellite 105 may operate in multiple spot beam mode, transmitting a number of narrow beams directed a different regions on the earth. This allows for segregation of user terminals 130 into various narrow beams.

Satellite 105 may be configured as a "bent pipe" or relay satellite. In this configuration, satellite 105 may perform frequency and polarization conversion of the received carrier signals before retransmission of the signals to their destination. A spot beam may use a single carrier, i.e. one frequency, or a contiguous frequency range per beam. A variety of physical layer transmission modulation encoding techniques may be used by satellite 105 (e.g., adaptive coding and modulation).

Satellite communication system 110 may use a number of network architectures consisting of space and ground segments. The space segment may include one or more satellites while the ground segment may include one or more user terminals, gateway terminals, network operation centers (NOCs) and satellite and gateway terminal command centers. The terminals may be connected by a mesh network, a star network, or the like as would be evident to those skilled in the art.

Forward downlink signals 150 may be transmitted from satellite 105 to one or more user terminals 130. User terminals 130 may receive downlink signals 150 using antennas 127. In one embodiment, antenna 127 and user terminal 130 together comprise a very small aperture terminal (VSAT), with antenna 127 measuring approximately 0.6 m in diameter and having approximately 2 W of power. In other embodiments, a variety of other types of antenna 127 may be used as user terminals 130 to receive downlink signals 150 from satellite 105. Each of the user terminals 130 may comprise a single user terminal or, alternatively, may comprise a hub or router, not shown, that is coupled to multiple user terminals. Each user terminal 130 may be connected to various consumer electronics comprising, for example, computers, local area networks, Internet appliances, wireless networks, and the like.

In some embodiments, a multi-frequency time division multiple access (MF-TDMA) scheme is used for upstream links 140 and 145, allowing efficient streaming of traffic while maintaining flexibility and allocating capacity among each of the user terminals 130. In these embodiments, a number frequency channels are allocated which may be fixed, or which may be allocated in a more dynamic fashion. A time division multiple access (TDMA) scheme may also be employed in each frequency channel. In this scheme, each frequency channel may be divided into several timeslots that can be assigned to a connection (i.e., a user terminal 130). In other embodiments, one or more of the upstream links 140, 145 may be configured using other schemes, such as frequency division multiple access (FDMA), orthogonal frequency division multiple access (OFDMA), code division multiple access (CDMA), or any number of hybrid or other schemes known in the art.

User terminal 130 may transmit data and information to a network 120 destination via satellite 105. User terminal 130 may transmit the signals by upstream link 145 to satellite 105 using antenna 127. User terminal 130 may transmit the signals according to various physical layer transmission modulation encoding techniques, including for example, those defined with the DVB-S2, WiMAX, LTE, and DOCSIS standards. In various embodiments, the physical layer techniques may be the same for each of the links 135, 140, 145, 150, or maybe different.

Satellite 105 may support non-processed, bent pipe architectures with PAFR or PPAFR antennas used to produce multiple small spot beam patterns. The satellite 105 can include K generic pathways, each of which can be allocated as forward pathways or return pathways at any instant of time. Large reflectors may be illuminated by a phased or a partitioned phased array providing the ability to make arbitrary spot beam patterns within the constraints set by the size of the reflector and the number and placement of antenna elements and the number and relative orientation of the partitions. PPAFR and PAFR antennas may be employed for both receiving uplink signals 130, 140, or both and transmitting downlink signals 140, 150, or both. The beam forming networks (BFNs) associated with the receive ($R_x$) and transmit ($T_x$) phased arrays may be dynamic, allowing for quick movement of the locations of both the $T_x$ and $R_x$ beams. The dynamic BFN's may be used to quickly hop both $T_x$ and $R_x$ beam positions.

Various operational characteristics of an unpartitioned PAFR antenna in satellite 105 become evident when user terminals 130-1 and 130-2 are geographically separated by even nominal distances. For example, if a PAFR antenna equipped satellite 150 is in geostationary orbit somewhere above the center of the United States, and user terminal 130-1 is located in the San Francisco Bay area, while user terminal 130-2 is located somewhere on the eastern seaboard of the United States, alternately transmitting beams to and from the user terminals 130-1 and 130-2 often means that only some of the phased array is contributing the formation of the beams. Accordingly, a significant portion of the particular antenna elements and the corresponding beam forming hardware of the phased array are underutilized at any given time. Various embodiments of the present disclosure can make use of the underutilized portions of the phased array.

Underutilized Beam Steering PAFR Antenna Systems

Figure 2A:
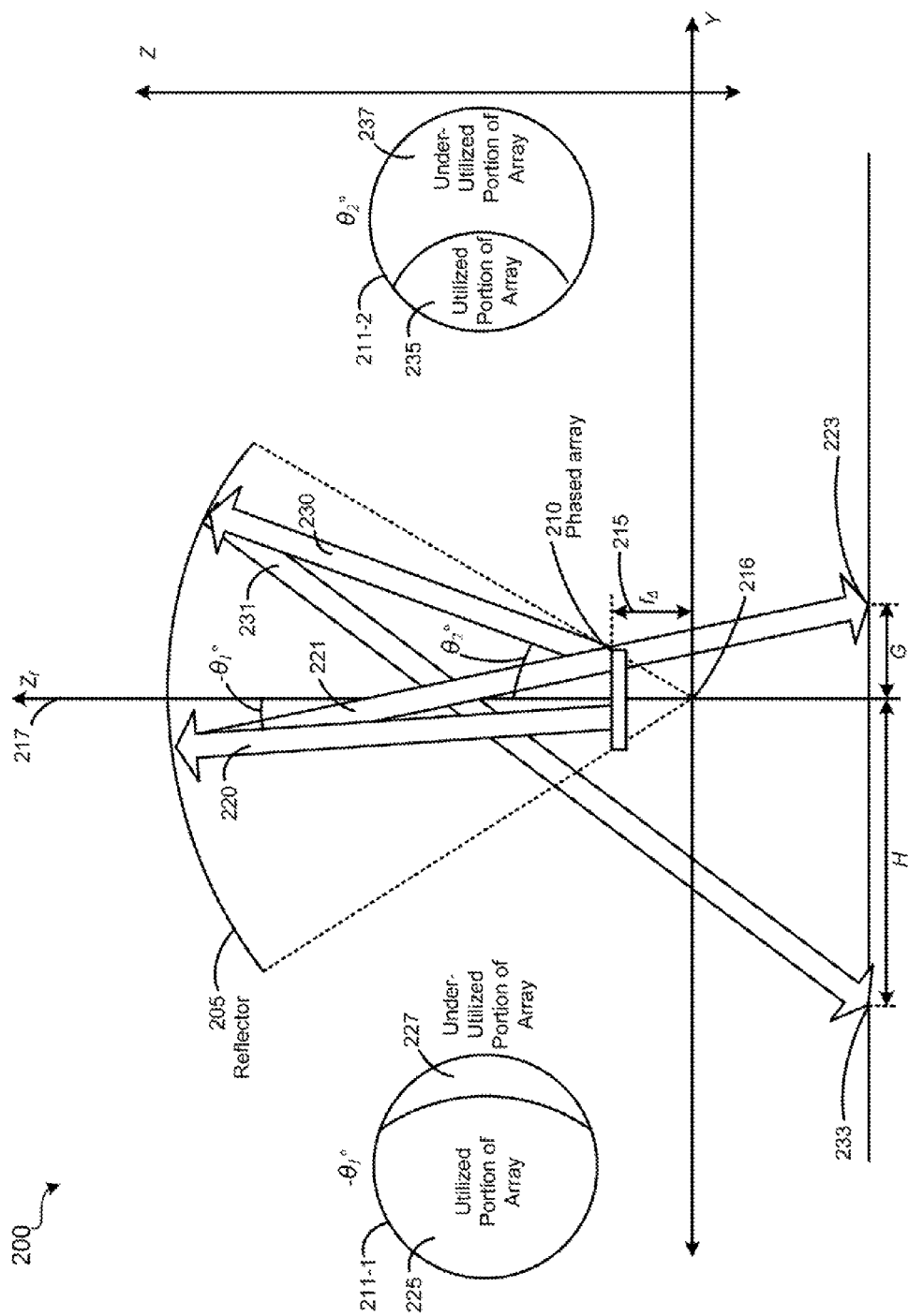
FIG. 2A illustrates a phased array fed reflector (PAFR) antenna that can be improved by various embodiments of the present disclosure.

FIG. 2A illustrates an example configuration of a PAFR antenna system 200. As shown, the PAFR antenna includes a reflector 205 and a phased array 210 disposed some distance, $f_A$, 215 from the focal point 216 of reflector 205. In one embodiment, distance 215 places the phased array 210 in front of the focal point 216, as shown. In another embodiment, the distance 215 places the phased array 210 behind the focal point 216. In other embodiments, the phased array 210 can be disposed with the center of the array 210 on or off the central axis 217 of the reflector 205.

The phased array 210 can be operated according to multiple beams weight and multiple beam hopping configurations to generate one or more patterns of directed spot beams at some angular offset from the central axis 217 of the reflector 205. To simplify the FIG. 2A and the following discussion, the description of the beams and the beam patterns reference single beams, however, one of ordinary skill in the art will recognize that the embodiments of the present disclosure can be extended to constant and time varying spot beam patterns.

In the specific example shown in FIG. 2A, beam 220 is offset from the central axis 217 by $-\theta_1°$, which causes the reflected beam 221 to be directed at point 223 that is geographically offset from the projection of the central axis 217 by some distance G. When the phased array 210 is operated to generate beam 220 and reflected beam 221, the approximate utilization of the antenna elements of phased array 210 is represented by diagram 211-1. As shown, diagram 211-1 depicts a utilized portion 225 of the phased array that is larger than the underutilized portion 227 phased array. Accordingly, the phased array 210 is mostly utilized when generating beams 220 and 221. In contrast, the phased array 210 can generate beam 230 that is offset from the central axis by $\theta_2°$, which causes the reflected beam 231 to be directed at a location 233 that is geographically offset from the projection of central axis 217 by some distance H. Diagram 211-2 represents the approximate utilization of the antenna elements in the phased array 210 when the phased array 210 is operated to generate beams 230 and 231. As shown, the underutilized portion 237 is significantly larger than the utilized portion 235. In fact, for some angles $\theta°$, the underutilized portion 237 accounts for the majority of the antenna elements of the phased array 210. FIG. 2A depicts just two of many possible sets of beams and reflected beams in just two dimensions, however, the depiction of phased array 210 and reflector 205 can be extended into three dimensions, such that PAFR antenna system 200 can generate and direct beams in three dimensions. Specifically, PAFR antenna system 200 can generate and direct beams anywhere within some radius around the central axis 217 of the reflector 205.

Figure 2B:
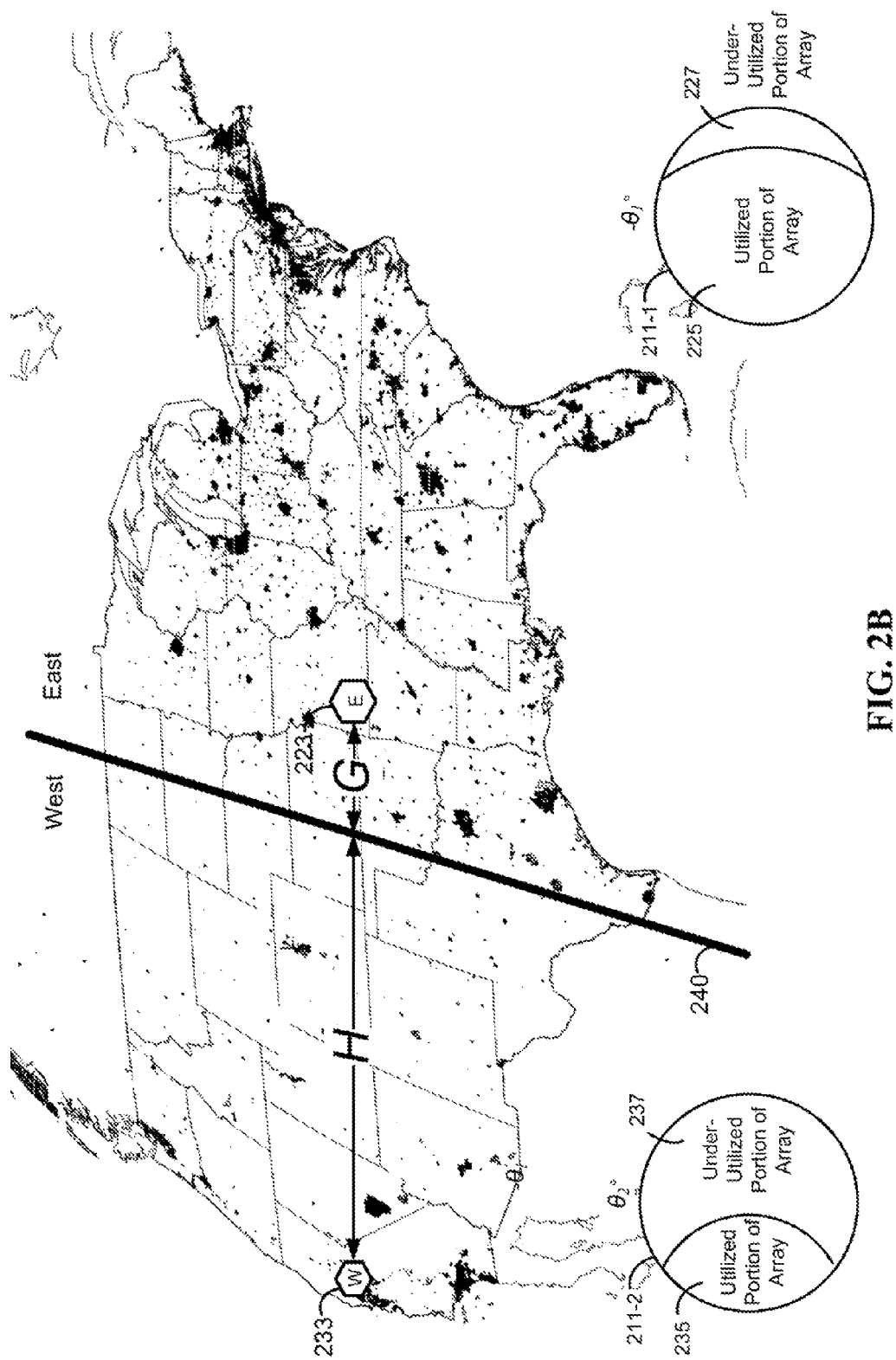
FIG. 2B illustrates geographically separated communication spot beams generated by a PAFR antenna equipped satellite.

FIG. 2B illustrates two possible corresponding projections of the spot beams 221 and 231 directed at locations 223 and 233 from a PAFR antenna equipped satellite in geosynchronous orbit with a central axis disposed in alignment with line 240. As illustrated by diagrams 211-1 and 211-2, when a PAFR antenna equipped satellite attempting to communicate with user terminals 130 spread across the United States, various portions of the phased array 210 are underutilized. Largely due to the corresponding beam forming hardware, underutilized portions of the phased array 210 can account for a significant proportion of the inherent size, weight, and power consumption of a phased array antenna when used to generate spot beams directed at various ranges of angles.

Figure 2C:
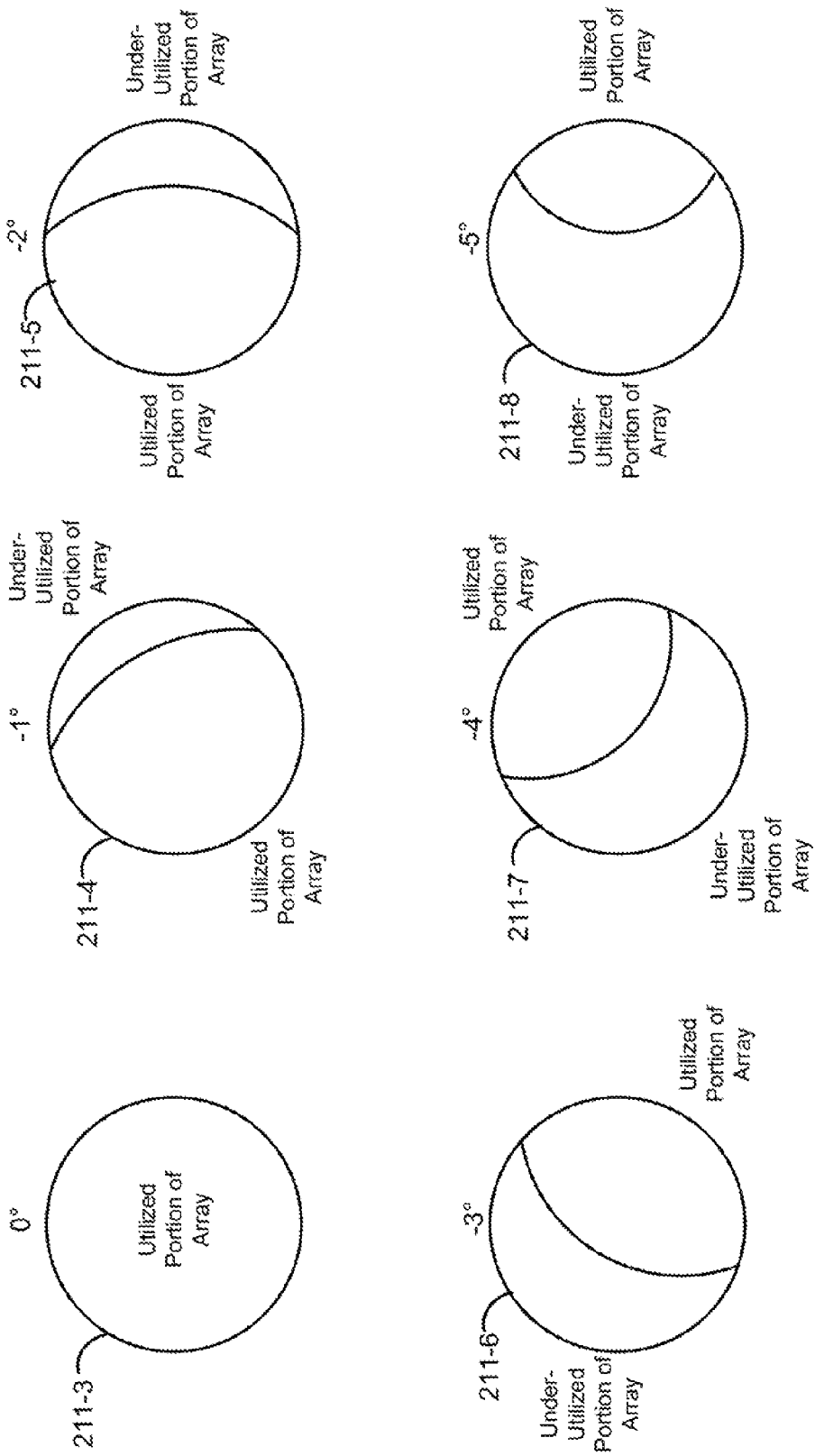
FIG. 2C illustrates a representation of antenna utilization in a phased array while generating a range of on and off bore-sight spot beams.

FIG. 2C further represents the approximate utilized and underutilized regions of the phased array 210 when generating beams that are angularly offset from the central axis 217 of the reflector 205 at various rotational angles about the central axis 217. As illustrated in diagrams 211, as the phased array 210 generates spot beams that are angularly offset from 0° through −5°, the utilized portion of the array decreases. For example, when the spot beams are generated with a 0° offset from the central axis 217, the phased array is typically fully utilized, as shown in diagram 211-3. However, when the spot beams are generated at −1° relative to the central axis 217, the underutilized portion of the array increases, as shown in diagram 211-4. This trend continues as shown in diagram 211-5 through diagram 211-8 for angular offsets from the central axis 217, −2° to −5°. Diagram 211-6 illustrates how approximately the majority of the antenna elements of the phased array 210 are underutilized when spot beams are angularly offset from the central axis 217 by as little as −3°.

Figure 2D:
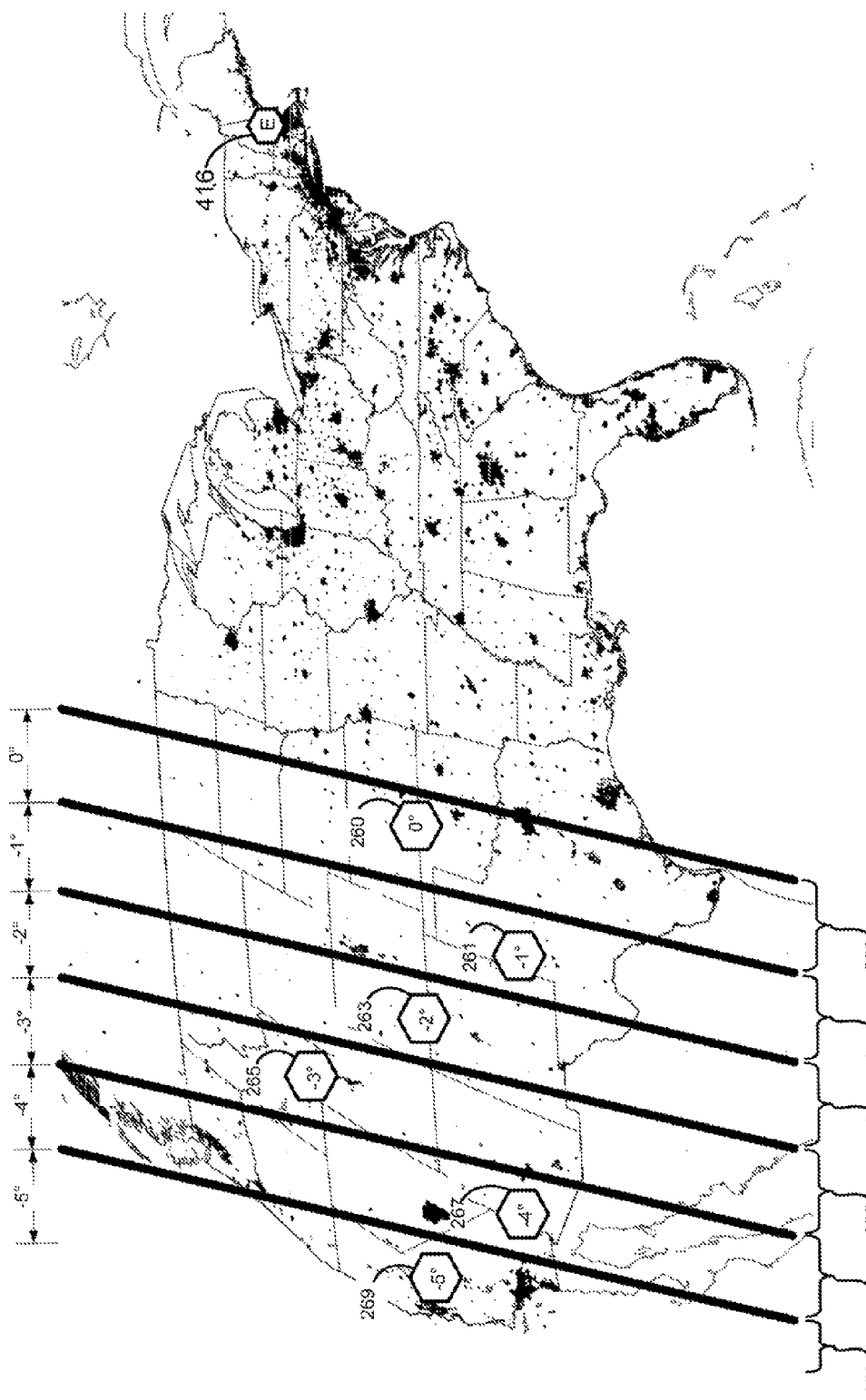
FIG. 2D illustrates the geographic separation of the range on and off bore-sight spot beams of FIG. 2C.

FIG. 2D illustrates an approximation of one possible configuration of the beams incident on the earth generated by a PAFR antenna with the angular offsets from the central axis 217 of the reflector 205 and phased array utilization and rotational profiles of FIG. 2C. For example, spot beam 260 in region 250 can be generated with a 0° angular offset. Spot beam 261 in region 251 can be generated with a −1° offset from and a particular rotational displacement about the central axis 217. Spot beam 263 can be generated in region 253 with a −2° offset with a particular rotational displacement about the central axis 217. Similarly spot beams 265, 267, and 269, can be generated in regions 255, 257, and 259, using angular offsets of −3°, −4°, and −5°, respectively with corresponding particular rotational displacements about the central axis 217. Thus, for spot beams generated in any region west of region 253 the phased array can include significant underutilization of the reflector antenna and corresponding beam forming hardware. Various embodiments of the present disclosure can be implemented by partitioning the phased array so that a larger percentage of the antenna elements and beam forming hardware of the phased array is used. Such improved utilization represents potential increased efficiency and reduced cost in size, weight, and power constrained systems, like communication satellites.

Figure 3:
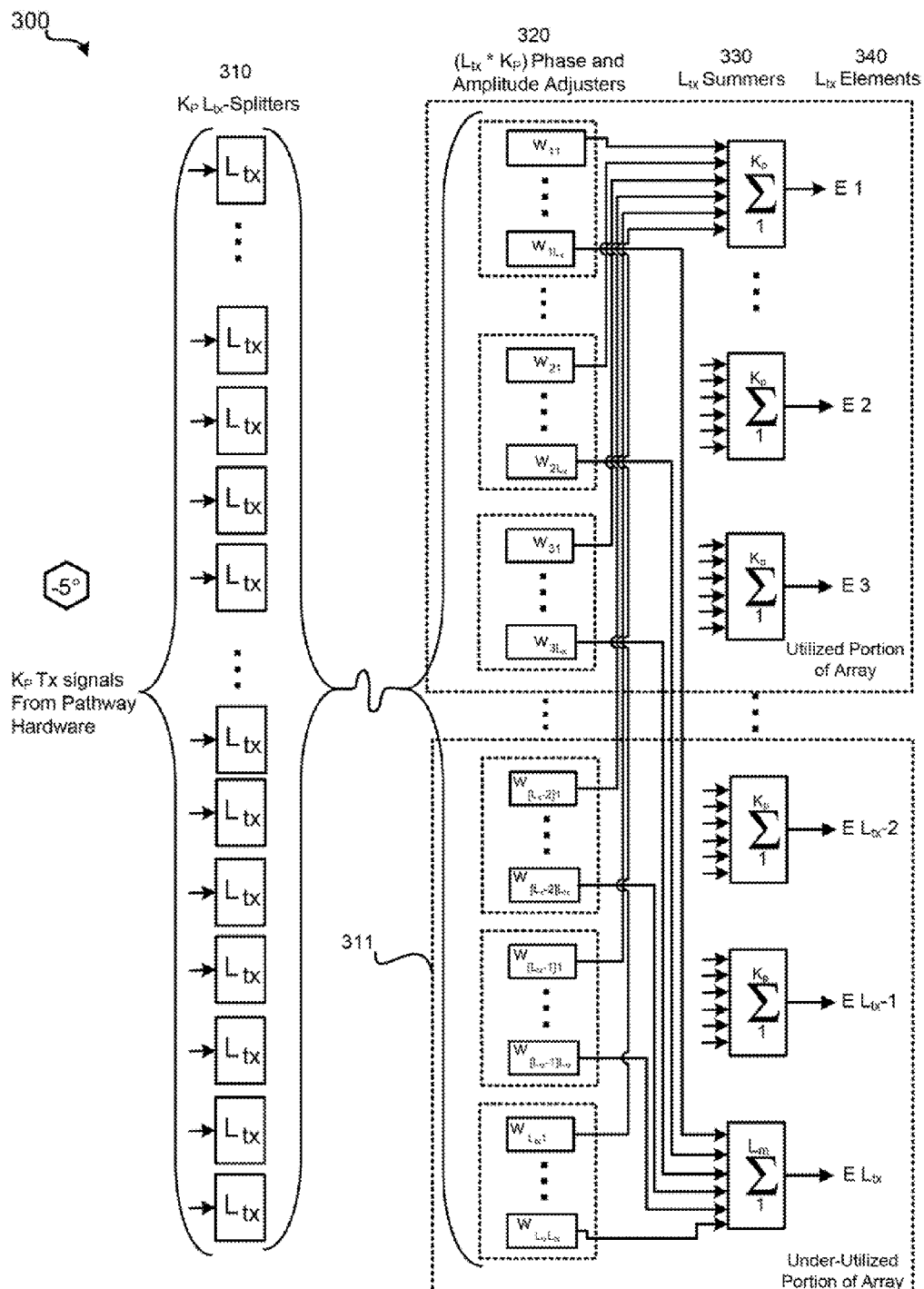
FIG. 3 illustrates a block diagram of a beam forming network in a PAFR antenna that can be improved by embodiments of the present disclosure.

FIG. 3 illustrates a functional block diagram of a transmission beam forming network ($T_x$ BFN) 300 connected to a conventional unpartitioned phased array. The $T_x$ BFN 300 takes in signals from $K_P$ transmission signal pathways, processes the signals, and then uses $L_{tx}$ antenna elements 340 to transmit corresponding spot beam patterns. Each of the $K_P$ signals is first split by splitters 310, into $L_{tx}$ identical copies, one for each of the $L_{tx}$ antenna elements 340 used for transmission. Accordingly, $L_{tx}$ parallel "transmission beam formers" are realized. Each transmission beam former may include amplitude and phase adjustment circuitry 320, and summers 330. Amplitude and phase adjustment circuitry 320 may take an input signal from one of the $K_P$ splitters and provides an amplitude and phase adjusted version of the signal. The $L_{tx}$ amplitude and phase adjusted signals are then summed using the summers 330 to produce the signals for transmission by the L antenna elements 340. As used in reference to ($T_x$ BFN) 300 of FIG. 3, $K_P$ and $L_{tx}$ are natural numbers.

In a PAFR antenna system that includes $T_x$ BFN 300 with $K_p$ pathways transmitted at some angle −θ° using a phased array having $L_{tx}$ elements results in some portion 311 of underutilized amplitude and phase adjustment circuitry 320, summers 330, and antenna elements 340. Effectively, for some range of transmission angles, a significant amount of weight and throughput capacity associated with amplitude and phase adjustment circuitry 320, summers 330, antenna elements 340, as well as all the wires, cables, and traces connecting all the components in portion 311 is under used or unused. Embodiments of the present disclosure are directed towards systems and methods for regaining the capacity represented by such otherwise unutilized hardware to increase throughput capacity while maintaining or reducing the size, weight, and power consumption of a phased array 210 with a given number $L_x$ of antenna elements 340.

Partitioned Phased Array Fed Reflector Antennas

Figure 4A:
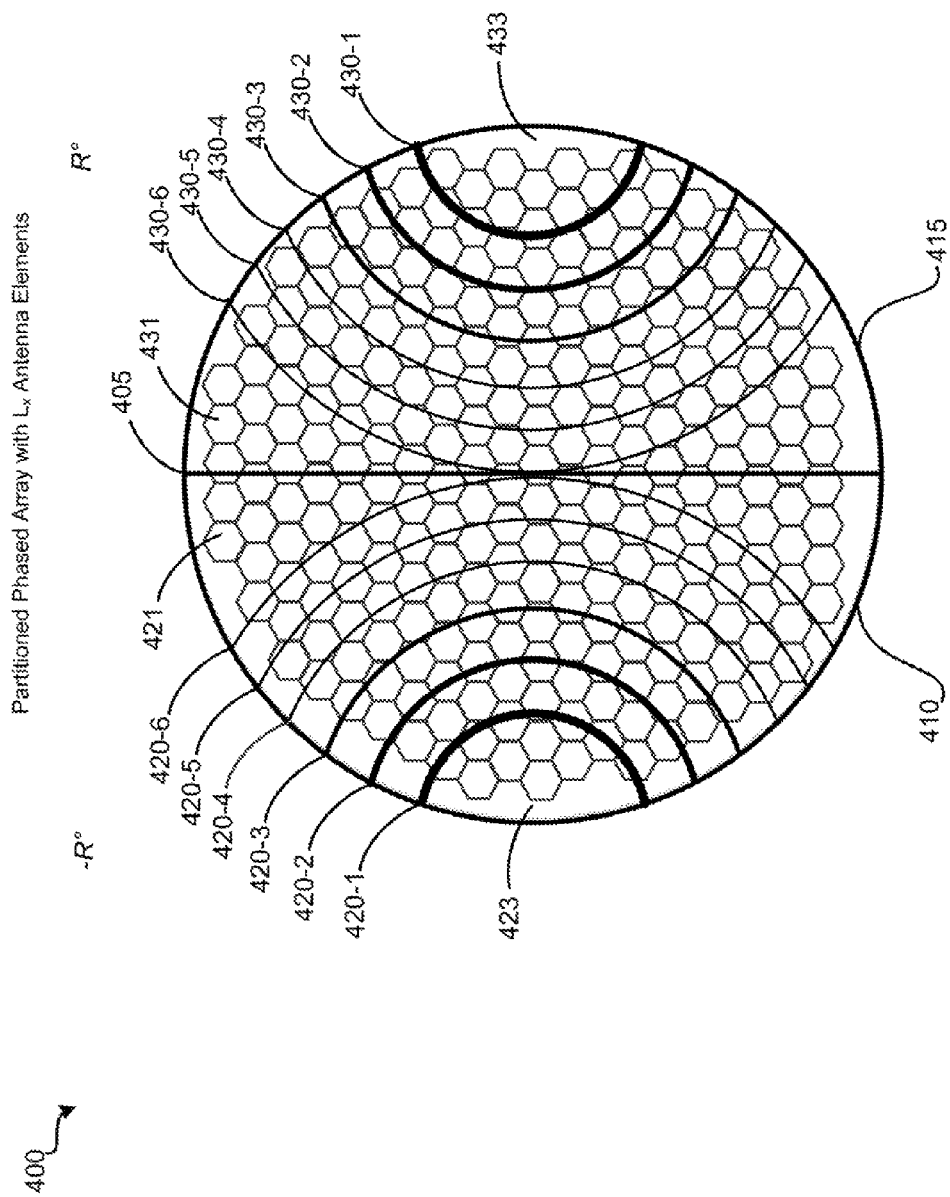
FIG. 4A illustrates the utilization of antenna elements in a partitioned phased array fed (PPAFR) antenna according to one embodiment of the present disclosure.

FIG. 4A depicts a partitioned phased array 400 according to an embodiment of the present disclosure. As shown, partitioned phased array 400 may include any number, $L_x$, of elements segmented into partitions 410 and 415 by division line 405. The antenna elements in partition 410 can be operated according to a beam steering scheme to generate spot beam patterns offset from the central axis of an associated reflector by −R°. Similarly, the elements in partition 415 can be operated to generate spot beam patterns offset from the central axis of the corresponding reflector by R°. While the angular offset of the spot beam patterns generated by partitions 410 and 415 shown in the specific example shown in FIG. 4A are symmetrical about the division line 405, in other embodiments, the angular offset between the generated spot beam patterns can be asymmetrical (e.g., the spot beam patterns generated by partition 410 can be generated at one angle relative to the division line 405, and the spot beam patterns generated by region 415 can be generated at a different angle).

The utilization of the elements in partitions 410 and 415 is represented by the range of arcs 420 and 430. In the specific example shown, antenna elements in the region 423 of the array 400 within arc 420-1 are more fully utilized than the antenna elements located in the region 421 of the array outside arc 420-6. Similarly, antenna elements in the region 433 inside arc 430-1 are more utilized than the antenna elements in the region 431 outside of arc 430-6. Despite the apparent underutilization of some portion of the antenna elements near the center division line 405 of the partitioned phased array 400, a higher proportion of the $L_x$ antenna elements in the phased array are utilized in the partitioned phased array 400 than if all the $L_x$ elements of the array are operated to generate one or the other of the −R° or R° offset spot beam patterns.

In one embodiment of the present disclosure, some number of spot beam patterns can be generated using the bilaterally partitioned phased array 400 of FIG. 4A. Using fewer than all of the $L_x$ antenna elements of the partitioned array to form multiple spot beam patterns allows the partitioned phased array to use fewer phase and amplitude adjusters and fewer summers, thus reducing the size, weight, and power consumption of a partitioned phased array fed reflector antenna relative to a unpartitioned phased array fed reflector antenna. In general the size and weight of the beam forming hardware in an unpartitioned phased array is proportional to:

$$(K_P * L_x)$$

Where $K_P$ is the total number of beams supported by an unpartitioned phased array with a total of $L_x$ antenna elements. The size and weight of the beam forming hardware in a partitioned phased array with the same number of $L_x$ total antenna elements is:

$$\sum_{1}^{N} K_P * \frac{L_x}{N} \leq (K_P * L_x)$$

Where and N is the number of partitions in the partitioned phased array with a total of $L_x$ antenna. While this particular illustrative expression assumes that $L_x$ is divisible by N to create N equally sized partitions, each of which also supports $K_p$ beams, in some embodiments, each partition can be include a different number of antenna elements and support a different number of beams. For example, unpartitioned phased array 210 configured to generate 128 beams using the entire $L_x$ antenna elements of the phased array 210, would usually be configured with 128×$L_x$ phase and amplitude adjusters. For example, if $L_x$=500, then the configuration would include 128×500=64,000 phase and amplitude adjusters and accompanying amplifiers, filters, and wiring. However, using partitioned phased array 400 to generate 64 beams at −R° using approximately half of the $L_x$ antenna elements and 64 beams at R° using approximately half of the $L_x$ antenna elements would include 2(64×250)=32,000 phase and amplitude adjusters and accompanying amplifiers, filters, and wiring. Accordingly, to generate a similar number of beams with a partitioned phased array represents approximately a 50% reduction in size and weight of the associated beam forming hardware. In addition, overall power consumption can be reduced due to reduction in beam forming hardware power consumption. Alternatively, the number of beams can be doubled without any increase in size or weight of the beam forming hardware. For example, instead of the 128 beams generated using all 500 antenna elements, partitions 410 and 415 can be operated to generate two sets of 128 beams offset from one another by 2R°. This configuration would include 2(128×250)=64,000 phase shifters and accompanying amplifiers, filters, and wiring. Accordingly, the overall size and weight of the PPAFR antenna system would not increase while effectively doubling the available throughput capacity relative to an unpartitioned PAFR antenna.

FIG. 4A illustrates that the phased array 400 can be divided down the middle of the $L_x$ elements vertically. In some embodiments, the phased array can be divided into two or more equal or unequal partitions. Each particular partitioning of the phased array can result in different configurations of angularly and geographically separated spot beam patterns. For example, if the division line 405 of the partitioned phased array is oriented along the north-south aspect of a geostationary satellite, then the resulting regions serviced by the resulting spot beam patterns can include a western region and an eastern region. Similarly, if the division line 405 is oriented along the east-west aspect of the geostationary satellite, then the resulting regions serviced by the resulting spot beam patterns can include a northern region and a southern region.

Figure 4B:
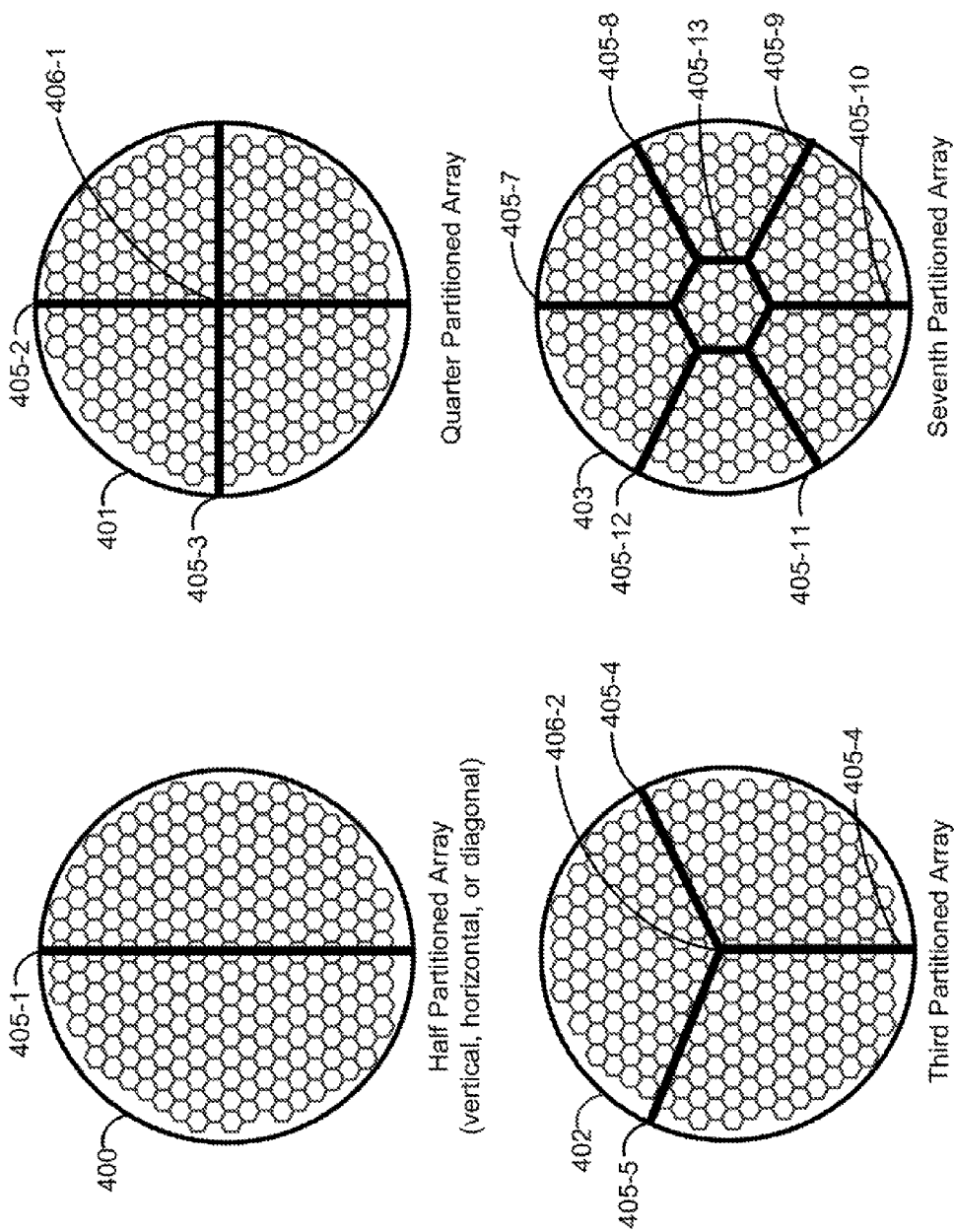
FIG. 4B illustrates example partitioned phased arrays according to various embodiments of the present disclosure.

In other embodiments $L_x$ elements of the phased array can be divided according to any number of schemes. FIG. 4B illustrates four specific examples of partitioned phased arrays 400, 401, 402, and 403. Partitioned phased array 400 is equivalent to the phased array 400 illustrated in FIG. 4A. Partitioned phased array 401 includes four partitions defined by intersecting division lines 405-2 and 405-3. While the division lines 405-2 and 405-3 are shown as being perpendicular to one another and approximately centered in the array, other angles and placements of the division lines 405-2 and 405-3 and intersection 406-1 are possible to create partitions of various sizes. Partitioned phased array 402 can be divided into three regions by division lines 405-4, 405-5, and 405-6 that intersect at intersection 406-2. Like the partitioned phased array 401, the angles defined by division lines 405-4, 405-5, and 405-6 can be any angle and the intersection 406-2 can be located anywhere within the phased array to define three equal or unequal partitions in the partitioned phased array 402. Depending on the requirements of the PPAFR antenna in which the partitioned phased array is disposed, the configuration of partitions in the partitioned phased array can take on any configuration. For example, partitioned phased array 403 includes seven partitions defined by division lines 405-7 through 405-13. As shown, division lines, such as division line 405-13 can include non-linear shapes of arbitrary sizes, (e.g. closed polygons such as the hexagon of division line 405-13).

Figure 4C:
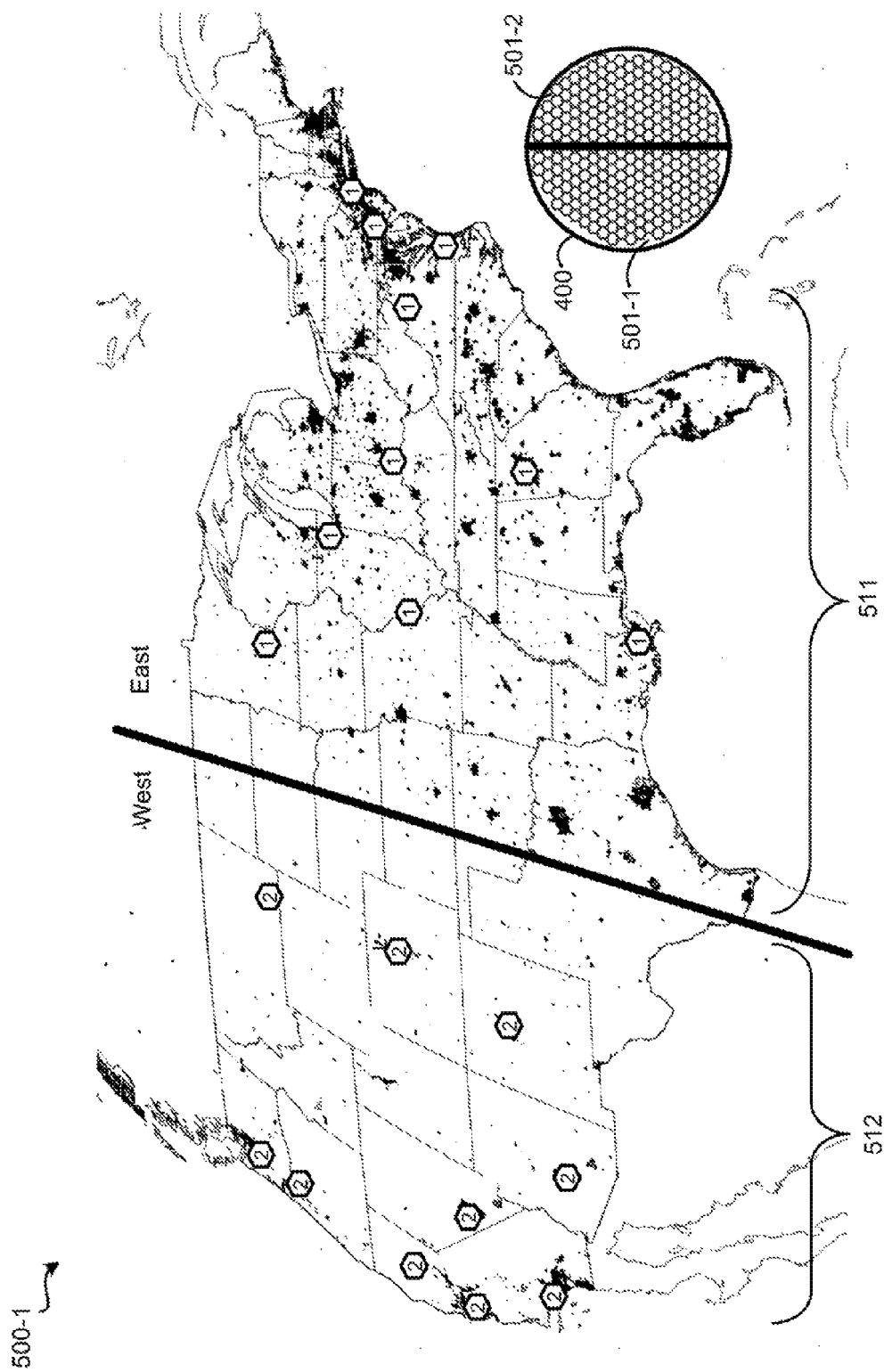
FIG. 4C illustrates an example spot beam pattern generated by a half partitioned phased array according to one embodiment of the present disclosure.

FIG. 4C depicts one possible spot beam pattern generated by partitioned phased array 400. As shown, the portion of the $L_x$ elements in partition 501-1 of the partitioned phased array 400 can generate a pattern of spot beams in the eastern region 511. The portion of the $L_x$ elements in partition 501-2 of the partitioned phased array 400 can generate a pattern of spot beams in the western region 512. While the pattern of spot beams in the eastern and western regions 511 and 512 include ten spot beams aimed at particular geographic locations, partitions 501 and 502 can generate more or fewer spots beams that change location, or "hop", as a function of time according one or more static or dynamic beam hopping schemes.

Figure 4D:
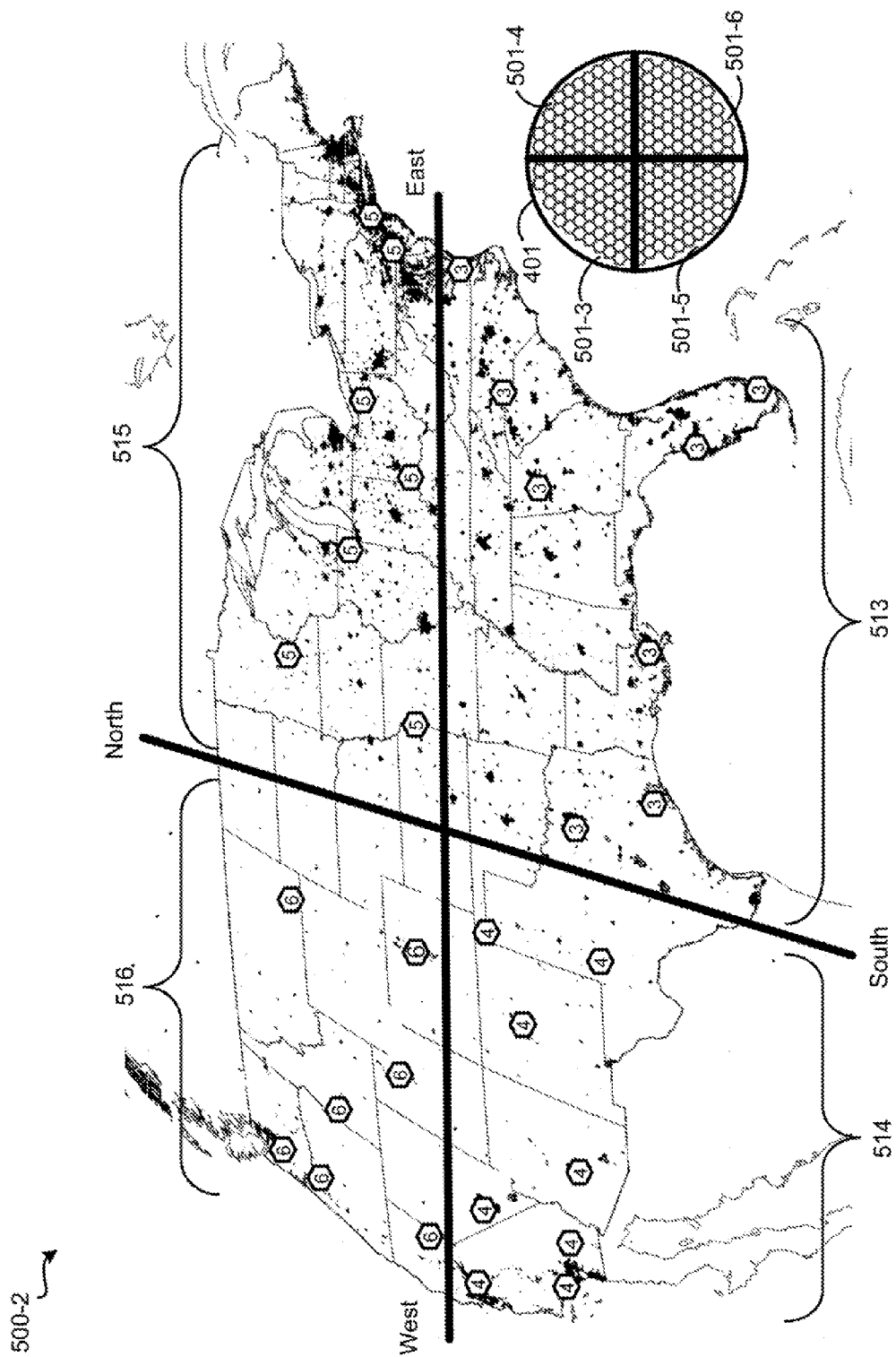
FIG. 4D illustrates an example spot beam pattern generated by a quarter partitioned phased array according to one embodiment of the present disclosure.

FIG. 4D depicts a possible configuration of spot beams generated by partitioned phased array 401 having four partitions 501-3 through 501-6. Partition 501-3 can generate the spot beam pattern shown in the southeast region 513. The partition 501-4 can generate the spot beam pattern in the southwest region 514. Similarly, partitions 501-5 and 501-6 can generate the spot beam patterns in the northeast region 515 and the northwest region 516, respectively. As discussed above in reference to FIG. 4C, the spot beam patterns within regions 513 through 516 can hop from one location to another based on one or more beam hopping schemes to facilitate communication between various locations within each of the regions. In some embodiments, only terminals located in the same geographic region can communicate with one another via pathways connected to the partitions 501 for that particular region. Accordingly, user terminals in northwest region 513 may not be able to communicate with a user terminal 130 or gateway 115 in the northeast region 514. However, in other embodiments, some or all of the partitions 501 can be coupled to one or more common pathways to facilitate occasional or consistent communication between user terminals 130 and/or gateways 115 located in any of the regions.

Figure 4E:
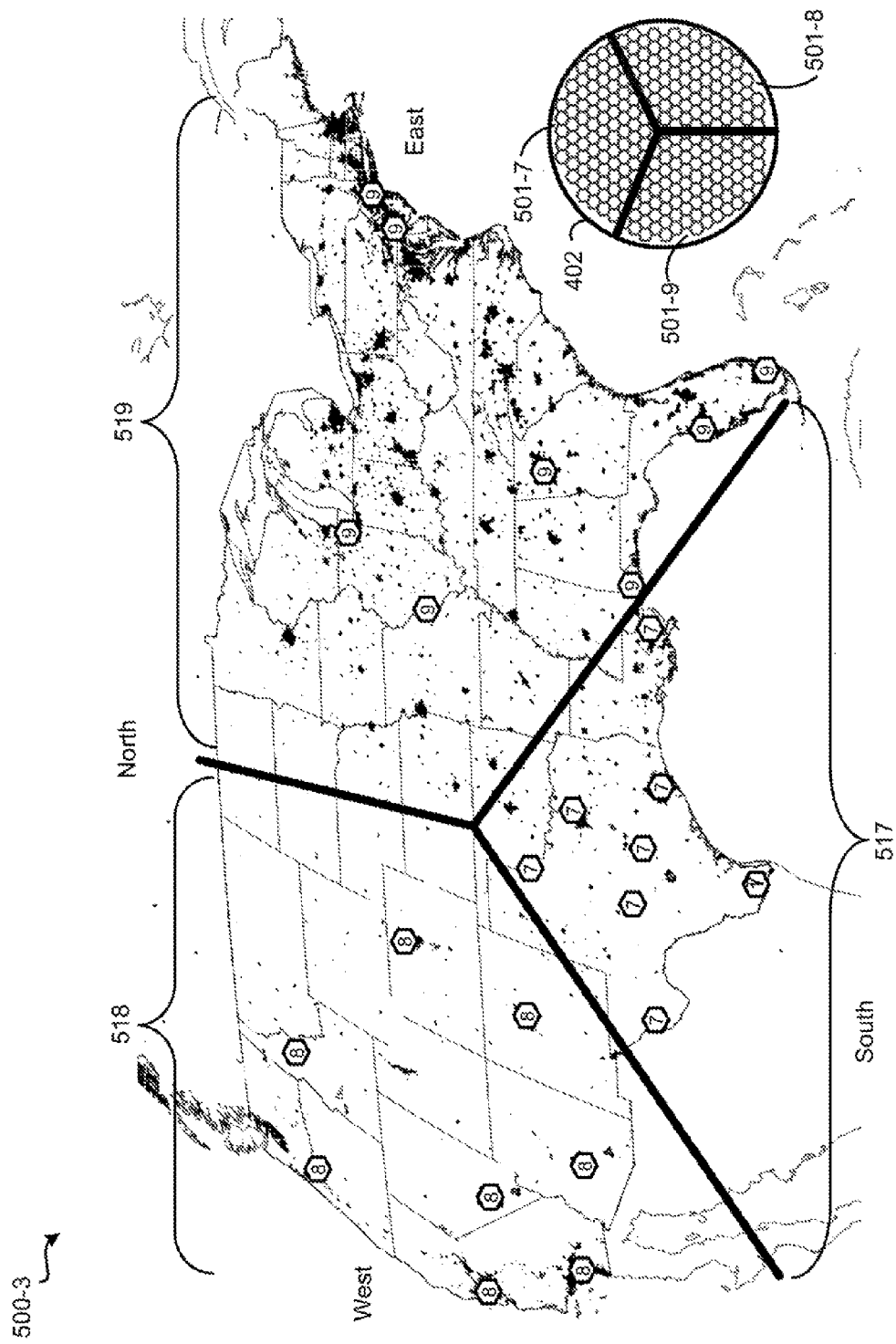
FIG. 4E illustrates an example spot beam pattern generated by a third partitioned phased array according to one embodiment of the present disclosure.

FIG. 4E depicts yet another configuration of possible spot beam patterns generated by a particular PPAFR antenna that includes a phased array similar to phased array 402. In this particular example, phased array 402 includes three partitions 501-7 through 501-9 that can generate spot beam patterns in the southern region 517, northwestern region 518, and northeastern region 519, respectively.

Figure 5A:
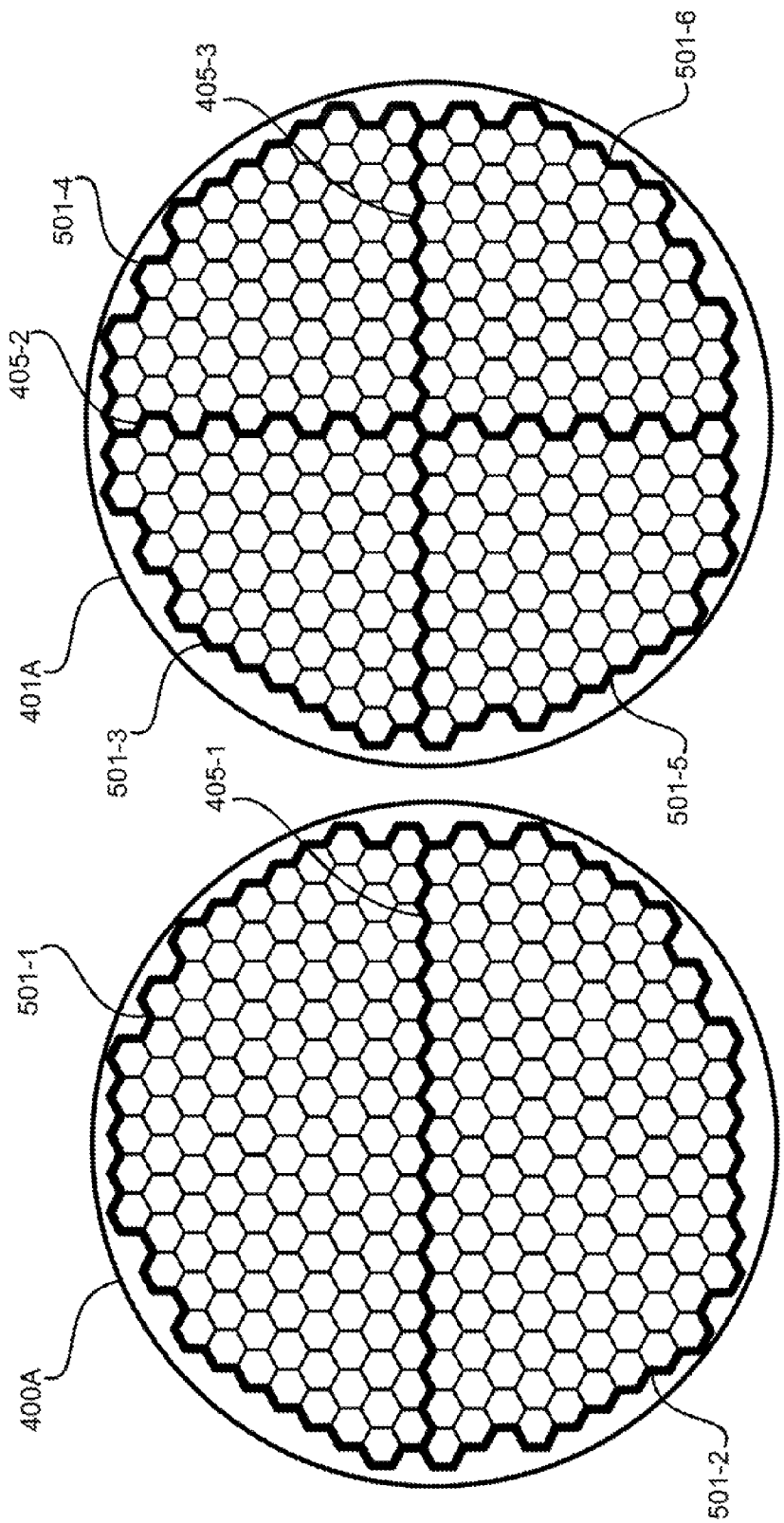
FIG. 5A illustrates the division of antenna elements in half and quarter partitioned phased arrays according to one embodiment of the present disclosure.
Figure 5B:
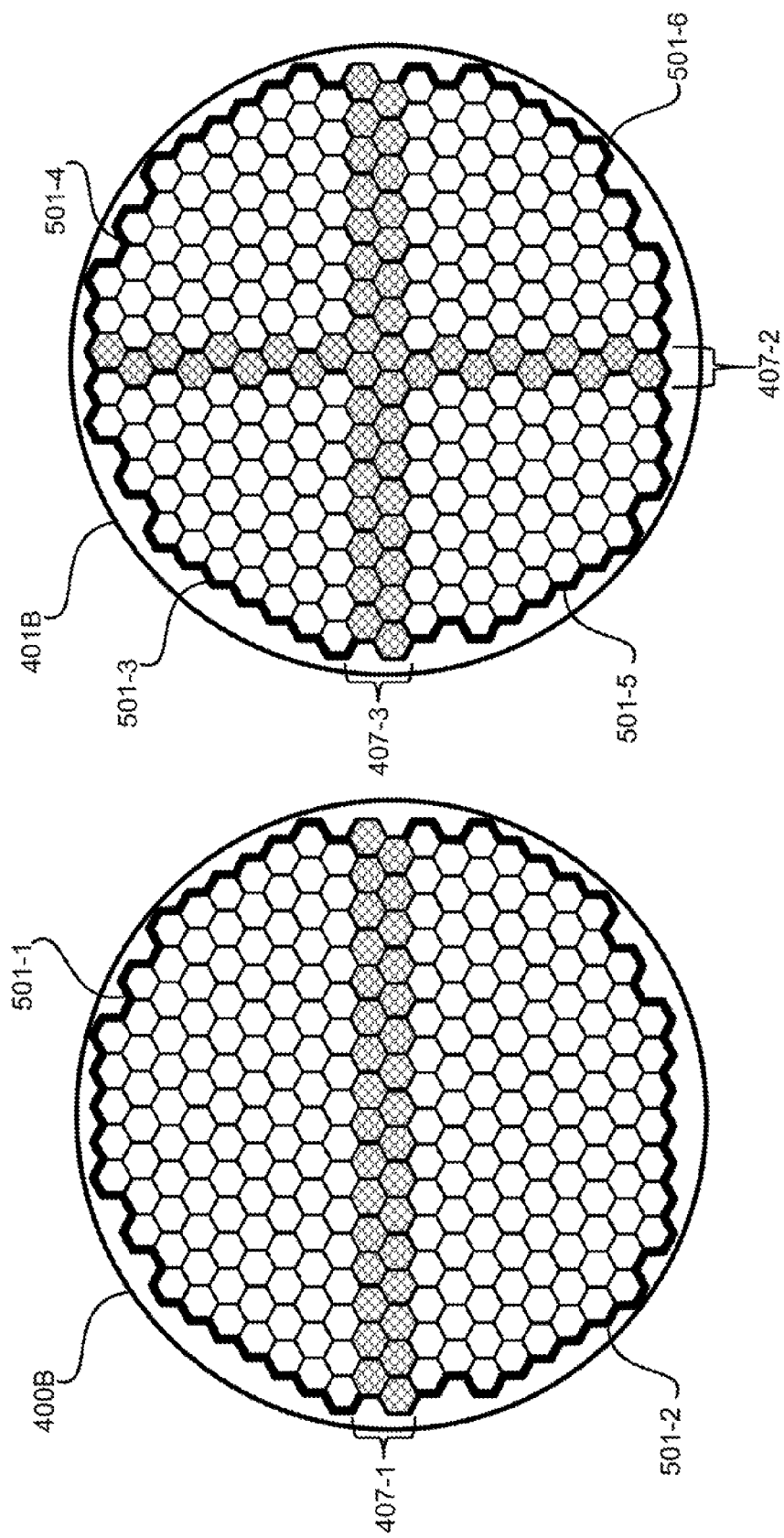
FIG. 5B illustrates the division of antenna elements in half and quarter partitioned phased arrays according to one embodiment of the present disclosure.

As discussed herein, configurations of partitioned phased arrays can include various numbers of partitions defined by different configurations of division lines. FIGS. 5A and 5B depict two possible configurations of division lines according to embodiments of the present disclosure. Specifically, FIG. 5A depicts partitioned phased arrays 400A and 401A. Phased array 400A, as discussed above in reference to phased array 400, includes two partitions 501-1 and 501-2 separated by division line 405-1. Partitioned phased array 401A includes four partitions 501-3 through 501-6. Each of the partitions 501 of phased array 401A are separated by the division lines 405-2 and 405-3. As depicted in FIG. 5A, each of the division lines 405 are defined along the borders between antenna elements in each of the partitions 501. Accordingly, antenna elements in one partition are exclusive to that partition.

In contrast, FIG. 5B illustrates other possible schemes for dividing the phased arrays 400B and 401B into multiple partitions 501 according to various embodiments of the present disclosure. The divisions between the partitions 501 may include a region, or range of antenna elements, 407 that can be incorporated or included in the operation of any one of the partitions 501 as needed. In particular, for partitioned phased array 400B, the partitions 501-1 and 501-2 can be separated by a region of antenna elements 407-1. In some configurations, the antenna elements in region 407-1 can be included in partition 501-1, while in other configurations, antenna elements in region 407-1 can be included in partition 501-2. Similarly, for the partitioned phased array 401, the partitions 501-3, 501-4, 501-5, and 501-6 can be separated from one another by the range of antenna elements 407-2 and 407-3. As shown, the dividing region of antenna elements can vary in size. For instance, in the specific example shown, region 407-2 can include a region that is one antenna element wide, while region 407-3 can include a region that is two antenna elements wide. Including antenna elements in each of the division regions 407 can increase the directivity of a particular partition in a partitioned phased array. However, the trade-offs of including antenna elements in multiple partitions includes an increase in beam forming circuitry required to include each of the antenna elements in the division zones 407 in the multiple partitions, thus incrementally increasing the size, weight, and power consumption in comparison to a partitioned phased array in which the partitions are mutually exclusive of one another.

Receiving ($R_x$) Beam Forming Networks

Figure 6:
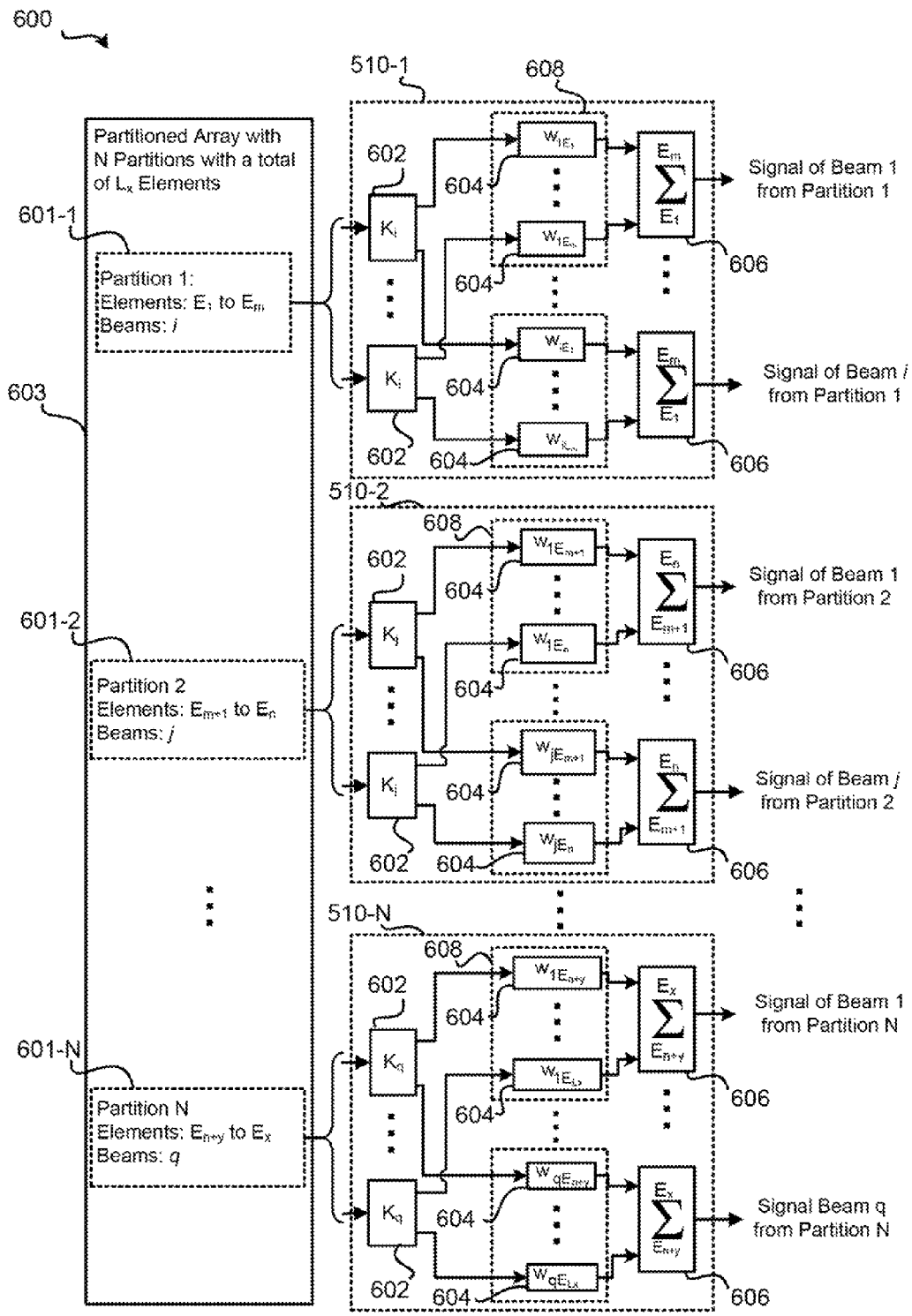
FIG. 6 illustrates a block diagram of receiving beam forming networks of a PPAFR antenna having a multi partition phased array according to one embodiment of the present disclosure.

FIG. 6 illustrates a block diagram of example receiving ($R_x$) BFNs 510 connected to a partitioned phased array 603, according to an embodiment of the present disclosure. The $R_x$ BFNs 510 can receive signals from $L_x$ antenna elements partitioned into Npartitions 601 of the partitioned phased array 603 and provide the received beam signals as outputs. In some embodiments, the output beam signals can include communication signals that can be fed into pathway communication pathway hardware.

In the particular example shown in FIG. 6, the partitioned phased array 603 can include Npartitions. Partition 601-1 includes elements $E_1$ to $E_m$ of the $L_x$ elements and can be configured to receive i beams. Partition 601-2 can include elements $E_{m+1}$ to $E_n$ of the $L_x$ elements and can receive j beams. Similarly, the final partition 601-N can include elements $E_{n+y}$ to $E_{Lx}$ of the $L_x$ elements and can receive q beams. Each partition 601 can include some exclusive or non-exclusive subset of the $L_x$ elements in the partitioned array. For example, in one example configuration in which the partitions a not mutually exclusive, some portion of the $L_x$ elements are in both in ranges $E_{m+1}$ to $E_n$ and $E_{n+y}$ to $E_x$, (e.g., n+y≤m+1). In another example, the partitions 601 can be mutually exclusive, such that there is no overlap between the ranges of elements $L_{m+1}$ to $L_n$, and $L_{n+y}$ to $L_x$, (e.g., n<n+y). As used herein, $L_x$, i, j, q, m, n, and x represent natural numbers.

The input signals from the antenna elements are first split, via splitters 602, into a number of identical copies, one copy for each beam that uses each particular antenna element. Accordingly, signals from elements $E_1$ to $E_m$ may be split into i identical copies using splitters 602 in $R_x$ BFN 510-1. Signals from antenna elements $E_{m+1}$ to $E_n$ may be split into j identical copies using splitters in $R_x$ BFN 510-2. Likewise, elements $E_{n+y}$ to $E_{Lx}$ may be split into q identical copies using splitters 602 in $R_x$ BFN 510-N. The $R_x$ BFNs 510 may include, among other components, amplitude and phase adjusters 604 and summers 606. The amplitude and phase adjusters 604 may take an input signal from one of the splitters associated with the corresponding partition and adjust the amplitude and phase of the signal. The amplitude and phase adjusted signals may then be summed using the summer 606 to produce a signal from which to form the received beam output corresponding to the received beam. The received beam outputs may then be fed into the corresponding independent signal pathways.

Figure 7:
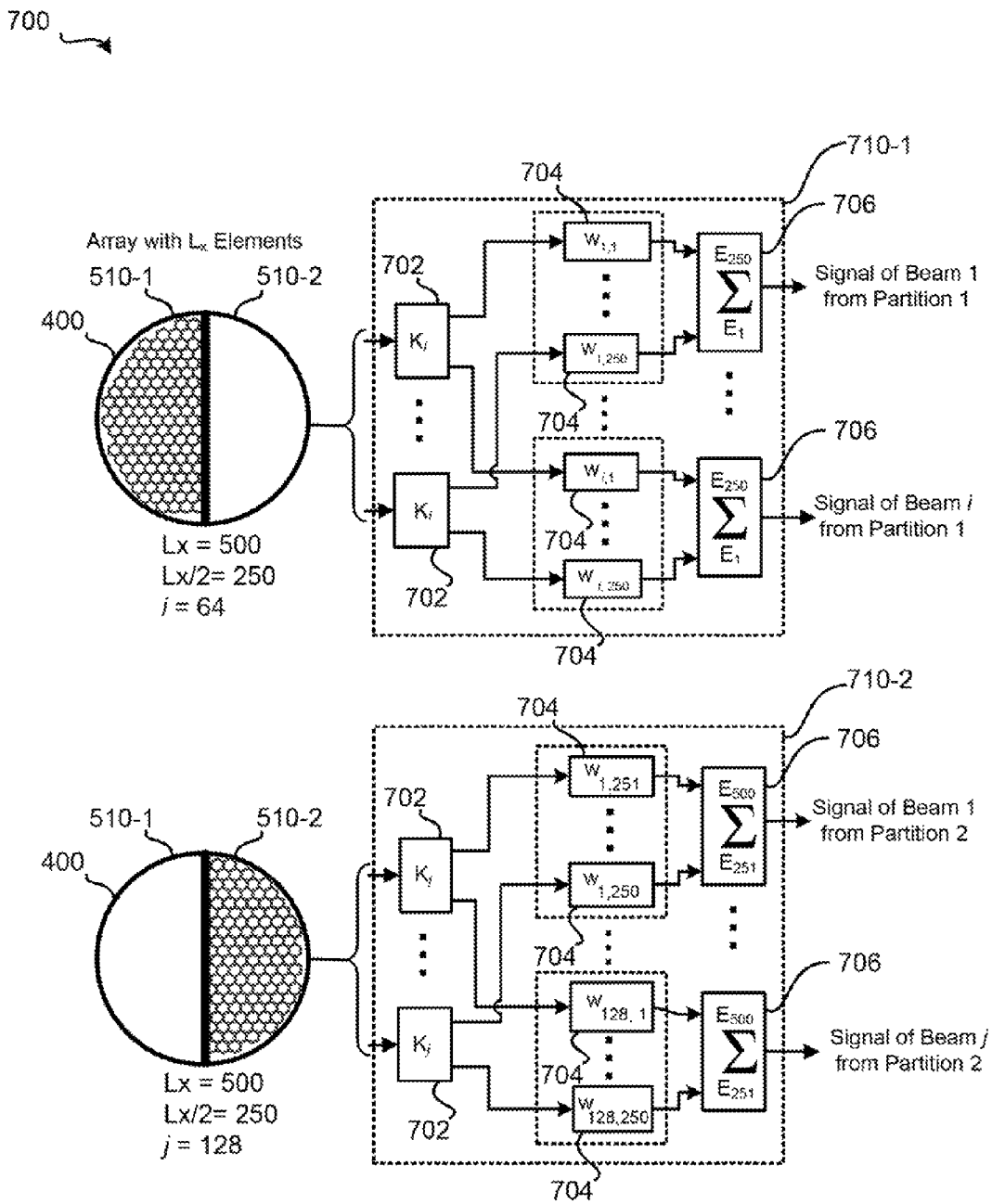
FIG. 7 illustrates a block diagram of receiving beam forming networks of a PPAFR antenna with half partitioned phased array according to one embodiment of the present disclosure.

FIG. 7 shows an example block diagram 700 of $R_x$ BFNs 710 for the partitioned phased array 400. As discussed herein, example phased array 400 can include partitions 501-1 and 501-2. The partitions 501-1 and 501-2 can include equal or unequal numbers of antenna elements. For the purposes of the following discussion of the example $R_x$ BFNs 710-1 and 710-2, partitions 501-1 and 501-2 can include 250 of the total 500 antenna elements of the phased array 400. In this particular example, partitions 501-1 and 501-2 do not share common antenna elements. As shown, the 250 antenna elements of partition 501-1 may be coupled to a corresponding splitter 702-i. Partition 501-1 supports i=64 beams and partition 501-2 supports j=128 beams. Accordingly, BFN 710-1 includes 250 64-port splitters coupled to (250×64)=16,000 phase and amplitude adjusters 704. BFN 710-2 includes 250 128-port splitters coupled to (250×128)=32,000 phase and amplitude adjusters 604. As such, the total number of phase and amplitude adjusters for the partitioned phased array 400 is 48,000. In contrast, a communication system with an unpartitioned phased array antenna with the same number of antenna elements supporting 128 beams would include (500×128)=64,000 phase and amplitude adjusters. Thus, by implementing a partitioned phased array with the particular configuration shown in block diagram 700, a 50% increase in throughput capacity with a 25% reduction in size and weight can be achieved relative to an unpartitioned system with an equally sized phased array supporting 128 beams.

Transmitting ($T_x$) BFNs

Figure 8:
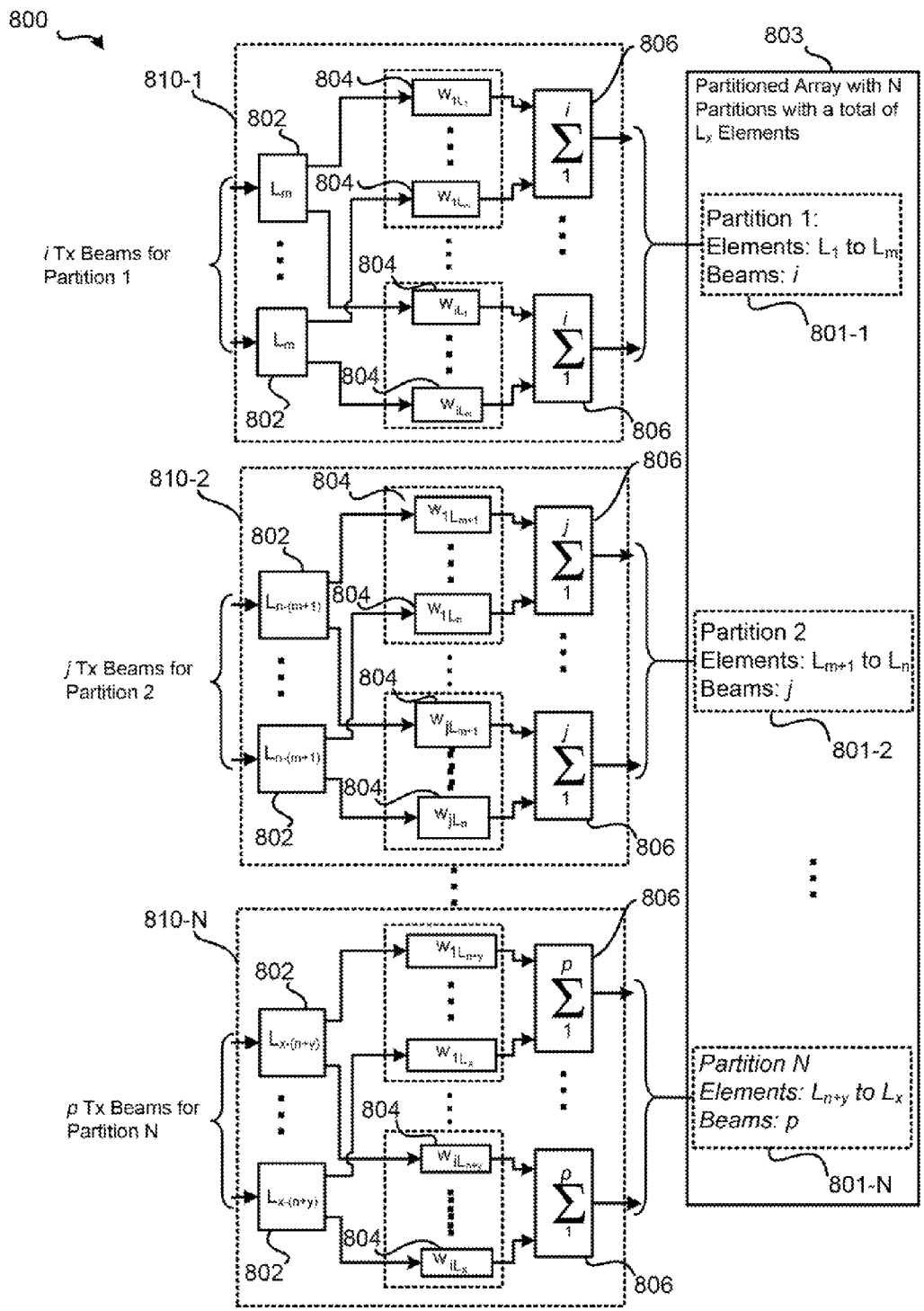
FIG. 8 illustrates a block diagram of transmission beam forming networks of a PPAFR antenna having a multi partition phased array according to one embodiment of the present disclosure.

FIG. 8 shows a functional block diagram 800 of the transmitting ($T_x$) BFNs 810 for a partitioned phased array 803 that includes N partitions 801. Each $T_x$ BFN 801 takes in signals from a corresponding signal pathway and provides the signals to corresponding antenna elements in each of the partitions 801. In the particular example shown, the N $T_x$ BFNs 801 support corresponding sets of beams having i, j, . . . p beams generated using the corresponding N partitions of antenna elements. Input signals from the pathways are split in the corresponding splitters 802. In one embodiment, the splitters 802 include one output that can include an identical copy of the input signal for each antenna element in the corresponding partition 801. In other embodiments, the splitter 802 may include more or fewer outputs than there are antenna elements in corresponding partition 801. In such embodiments, it is possible for one copy of the signal to be used to drive more than one antenna element. Each $T_x$ BFN 801 may include amplitude and phase adjusters 804 and summers 806. The amplitude and phase adjusters 804 may take an input signal from one of the splitters 802 and provide an amplitude and phase adjusted signal Summers 806 can then sum the resulting amplitude and phase adjusted signals for transmission in a corresponding beam using the corresponding partition 801.

Figure 9:
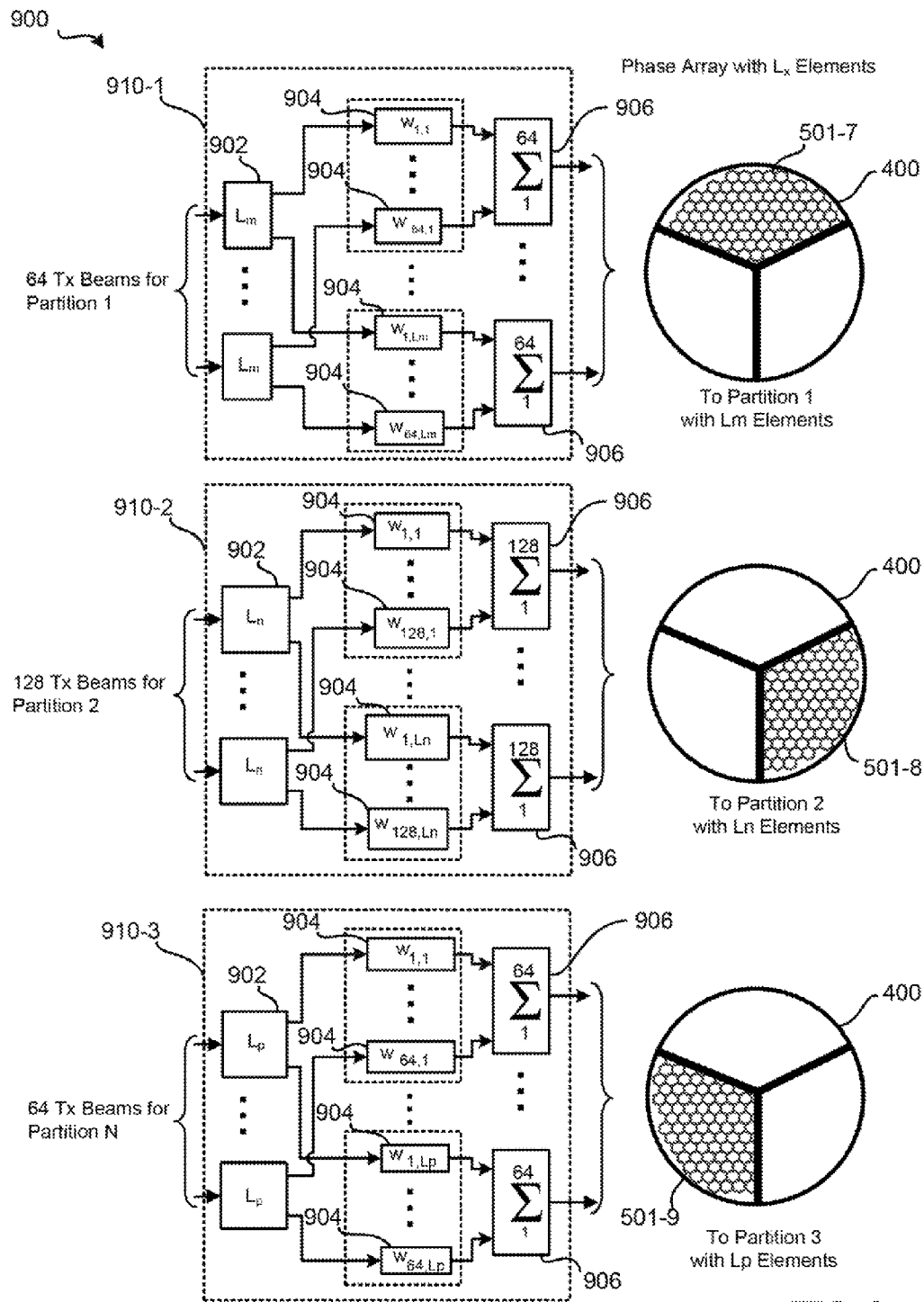
FIG. 9 illustrates a block diagram of transmission beam forming networks of a PPAFR antenna with third partitioned phased array according to one embodiment of the present disclosure.

FIG. 9 illustrates example block diagram 900 for generating $T_x$ beams using partitioned phased array 402 having three partitions 501-7, 501-8, and 501-9, and the $T_x$ BFNs 910-1, 910-2 and 910-3. The $T_x$ BFNs 910 may include as many splitters 902 as there are beams generated using the corresponding partitions 501. In the specific example shown, the partitions 501 can generate 64 $T_x$ beams. For example, the partitions can transmit 64 beams into three geographically separated regions to support some number of pathways. Accordingly, BFNs 910 may include 64 splitters 902 with a number of outputs equal to the number of antenna elements in the corresponding partition 501. In the specific example shown, the partition 507-7 includes $L_m$ antenna elements, partition 501-8 includes $L_n$ antenna elements, and partition 501-9 includes $L_p$ antenna elements. $L_m$, $L_x$ and $L_p$ can all be equal if the phased array includes a number of antenna elements divisible by 3. However, in other embodiments, in which the antenna elements cannot be equally divided into three equally sized partitions, or if the specifications of the PPAFR antenna system otherwise require, so $L_m$, $L_n$, and $L_p$ can all be different. The split signals can be fed into the respective phase and amplitude adjusters 904. The phase and amplitude adjusters 904 can adjust the split signals according to a particular beam weight scheme or beam hoping definition to generate phase and amplitude adjusted signals Summers 906 can then sum the phase and amplitude adjusted signals and the send the summed signals to the corresponding antenna elements in the corresponding partition 501. Each partition of phased antenna elements can thus transmit one or more angularly offset spot beam patterns.

Figure 10:
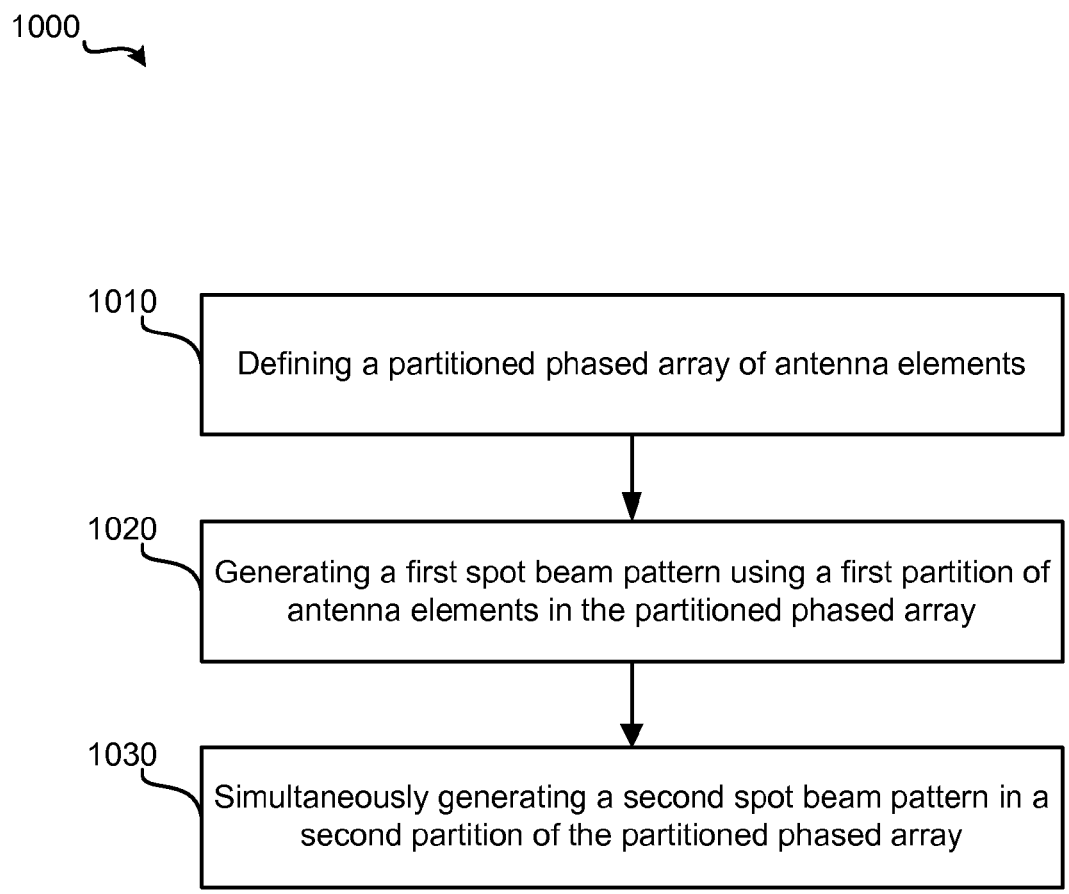
FIG. 10 is a flowchart of a method for operating a PPFAR antenna.

FIG. 10 is a flowchart of a method 1000 for a PPAFR antenna system, according to various embodiments of the present disclosure. Method 1000 can begin by defining a partitioned phased array of antenna elements in a PAFR antenna. Defining the partitioned phased array may include dividing the antenna elements into multiple partitions. In one embodiment, the partitions can include an equal number of the antenna elements. In another embodiment, some or all the partitions can include a different number of antenna elements. In either embodiment, partitions can include a set of contiguous antenna elements.

The partitions of antenna elements can be supported by corresponding dedicated transmitting and receiving BFNs. Each of the BFNs may include beam steering hardware that includes one phase and amplitude adjuster for each antenna element used to generate each beam using the corresponding partition. Accordingly, the BFNs can include a number of phase and amplitude adjusters equal to the number of antenna elements in the particular partition multiplied by the number of beams generated by that partitioned. The BFNs may also include a number of summers. In the receiving BFNs the number of summers can be equal to the number of elements in the corresponding partition. In the transmitting BFNs a number of summers can be equal to the number of supported by the corresponding partition.

The PPAFR antenna system can generate a first spot beam pattern using a first partition of antenna elements and a first BFN at 1020. In one embodiment, the first spot beam pattern can include multiple transmission beams generated using a first transmission BFN. In another embodiment, the first spot beam pattern can include multiple reception beams generated using a first receiving BFN. In yet another embodiment, the first spot beam pattern can include a combination of multiple reception and transmission beams for establishing a number of pathways that include at least one transmission beam and one reception beam. The PPAFR antenna system can generate the first spot beam pattern using the first partition and the first BFN operating according to a particular constant or time varying beam pattern definition or beam weighting scheme.

Method 1000 also includes the PPAFR antenna system simultaneously generating a second spot beam pattern using a second partition of antenna elements and a second BFN at 1030. The second spot beam pattern can be angularly offset from the first spot beam pattern. As with the first spot beam pattern, the second spot beam pattern can include multiple reception or transmission beams generated using a first receiving BFN or a first transmission BFN. Also, the first spot beam pattern may also include a combination multiple reception and transmission beams for establishing a number of pathways. In such embodiments, the pathways established the first and second spot beam patterns may be mutually exclusive. However, it is possible for the corresponding transmission and receiving BFNs to establish pathways using beams from both the first and second spot beam patterns.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method comprising:
   providing a phased array fed reflector antenna including:
      a reflector;
      an array of antenna elements arranged relative to the reflector; and
      a plurality of beam forming networks coupled to the array of antenna elements, the plurality of beam forming networks including a first beam forming network directly coupled to only a first partition of antenna elements in the array of antenna elements, and further including a second beam forming network directly coupled to only a second partition of antenna elements in the array of antenna elements, wherein antenna elements of the first partition of antenna elements and antenna elements of the second partition of antenna elements are mutually exclusive;
   communicating a first beam signal only between the first beam forming network and the first partition of antenna elements;
   communicating a second beam signal, different from the first beam signal, only between the second beam forming network and the second partition of antenna elements;
   applying a first beam weight scheme to the first beam forming network to generate a first spot beam associated with the first beam signal using the first partition of antenna elements; and
   simultaneously with applying the first beam weight scheme, applying a second beam weight scheme to the second beam forming network to generate a second spot beam associated with the second beam signal using the second partition of antenna elements.

2. The method of claim 1 wherein the first spot beam utilizes a frequency spectrum, and wherein the second spot beam utilizes at least a portion of the frequency spectrum.

3. The method of claim 1 wherein antenna elements that comprise the first partition of antenna elements are contiguous.

4. The method of claim 1 wherein the first spot beam and second spot beam are angularly offset from one another.

5. The method of claim 1 wherein the first spot beam comprises a first transmission beam or a first receiving beam, and
   wherein the second spot beam comprise a second transmission beam or a receiving beam.

6. The method of claim 5 further comprising establishing a first pathway for the first transmission beam or the first receiving beam.

7. The method of claim 5 further comprising establishing a first pathway comprising at least the first transmission or receiving beam and the second transmission or receiving beam.

8. The method of claim 1 further comprising a plurality of antennas elements selectively configurable to operate with the first partition of antenna elements or the second partition of antenna elements.

9. A satellite comprising:
a phased array fed reflector antenna including:
a reflector;
an array of antenna elements, the array of antenna elements comprising a plurality of partitions of antenna elements arranged relative to the reflector; and
a plurality of corresponding beam forming networks including a first beam forming network directly coupled to only a first partition of antenna elements in the plurality of partitions of antenna elements and a second beam forming network directly coupled to only a second partition of antenna elements in the plurality of partitions of antenna elements, wherein antenna elements of the first partition of antenna elements and antenna elements of the second partition of antenna elements are mutually exclusive,
the first beam forming network having a first port for a first beam signal that is communicated only between the first beam forming network and the first partition and having a first beam weight circuit to generate a first spot beam associated with the first beam signal using the first partition of antenna elements,
the second beam forming network having a second port for a second beam signal, different from the first beam signal, that is communicated only between the second beam forming network and the second partition and having a second beam weight circuit to generate a second spot beam associated with the second beam signal using the second partition of antenna elements simultaneously with the first spot beam.

10. The satellite of claim 9 wherein each of the spot beams utilizes at least a portion of a common frequency spectrum.

11. The satellite of claim 9 further comprising a plurality of antennas elements selectively configurable to operate with at least some of the plurality of partitions of antenna elements.

12. The satellite of claim 9 wherein antenna elements in at least one of the plurality of partitions of antenna elements are contiguous.

13. The satellite of claim 9 wherein the first and second spot beams include either or both a transmission spot beam and a receiving spot beam.

14. The satellite of claim 13 wherein the plurality of beam forming networks are further configured to establish a plurality of pathways, wherein each of the pathways comprises one or more of the transmission spot beam and the receiving spot beam.

15. A system comprising:
a plurality of terminals; and
a phased array fed reflector antenna system comprising:
a reflector;
an array of antenna elements, the array of antenna elements comprising a plurality of partitions of antenna elements arranged relative to focal point of the reflector; and
a plurality of corresponding beam forming networks including a first beam forming network directly coupled to only a first partition of antenna elements in the plurality of partitions of antenna elements and a second beam forming network directly coupled to only a second partition of antenna elements in the plurality of partitions of antenna elements, wherein antenna elements of the first partition of antenna elements and antenna elements of the second partition of antenna elements are mutually exclusive,
the first beam forming network having a first port for a first beam signal that is communicated only between the first beam forming network and the first partition and having a first beam weight circuit to generate a first spot beam associated with the first beam signal using the first partition of antenna elements,
the second beam forming network having a second port for a second beam signal, different from the first beam signal, that is communicated only between the second beam forming network and the second partition and having a second beam weight circuit to generate a second spot beam associated with the second beam signal using the second partition of antenna elements simultaneously with the first spot beam.

16. The system of claim 15, wherein each of the spot beams utilizes at least a portion of a common frequency spectrum.

17. The system of claim 15, wherein antenna elements in at least one of the plurality of partitions of antenna elements are contiguous.

18. The system of claim 17, further comprising a plurality of antennas elements selectively configurable to operate with at least two of the plurality of partitions of antenna elements.

19. The system of claim 15, wherein the plurality of terminals are disposed in a plurality of corresponding geographic regions, and wherein each of the spot beams is directed toward one of the corresponding geographic regions.

20. The system of claim 15, wherein the antenna system is disposed in a satellite in an orbit.

21. The method of claim 3, wherein all of the antenna elements that comprise the first partition of antenna elements are contiguous.

22. The method of claim 1, wherein the first partition of antenna elements and the second partition of antenna elements are on opposing sides of a central axis of the reflector.

23. The method of claim 1, wherein the first partition of antenna elements is arranged relative to the second partition of antenna elements along at least one axis of the array of antenna elements.

24. The method of claim 1, wherein the first partition of antenna elements partially surrounds a perimeter of the second partition of antenna elements.

25. The method of claim 1, wherein the plurality of beam forming networks includes a third beam forming network directly coupled to only a third partition of antenna elements in the array of antenna elements, wherein antenna elements of the first, second and third partitions of antenna elements are mutually exclusive.

26. The method of claim 25, wherein the first partition of antenna elements are adjacent to the second partition of antenna elements, and the second partition of antenna elements are adjacent to the third partition of antenna elements.

27. The method of claim 25, wherein the second partition of antenna elements is arranged relative to the third partition of antenna elements along a perimeter of the first partition of antenna elements.

28. The method of claim 25, wherein the second partition of antenna elements and the third partition of antenna elements each partially surround a perimeter of the first partition of antenna elements.

29. The method of claim 1, wherein a perimeter of the first partition of antenna elements is completely surrounded by other partitions of antenna elements.

30. The satellite of claim 12, wherein all of the antenna elements that comprise the first partition of antenna elements are contiguous.

31. The satellite of claim 9, wherein the first partition of antenna elements and the second partition of antenna elements are on opposing sides of a central axis of the reflector.

32. The satellite of claim 9, wherein the first partition of antenna elements is arranged relative to the second partition of antenna elements along at least one axis of the array of antenna elements.

33. The satellite of claim 9, wherein the first partition of antenna elements partially surrounds a perimeter of the second partition of antenna elements.

34. The satellite of claim 9, wherein the plurality of beam forming networks includes a third beam forming network directly coupled to only a third partition of antenna elements in the plurality of antenna elements, wherein antenna elements of the first, second and third partitions of antenna elements are mutually exclusive.

35. The satellite of claim 34, wherein the first partition of antenna elements are adjacent to the second partition of antenna elements, and the second partition of antenna elements are adjacent to the third partition of antenna elements.

36. The satellite of claim 34, wherein the second partition of antenna elements is arranged relative to the third partition of antenna elements along a perimeter of the first partition of antenna elements.

37. The satellite of claim 34, wherein the second partition of antenna elements and the third partition of antenna elements each partially surround a perimeter of the first partition of antenna elements.

38. The satellite of claim 9, wherein a perimeter of the first partition of antenna elements is completely surrounded by other partitions of antenna elements.

39. The system of claim 17, wherein all of the antenna elements that comprise the at least one of the plurality of partitions of antenna elements are contiguous.

40. The system of claim 15, wherein the first partition of antenna elements and the second partition of antenna elements are on opposing sides of a central axis of the reflector.

41. The system of claim 15, wherein the first partition of antenna elements is arranged relative to the second partition of antenna elements along at least one axis of the array of antenna elements.

42. The system of claim 15, wherein the first partition of antenna elements partially surrounds a perimeter of the second partition of antenna elements.

43. The system of claim 15, wherein the plurality of beam forming networks includes a third beam forming network directly coupled to only a third partition of antenna elements in the plurality of partitions of antenna elements, wherein antenna elements of the first, second and third partitions of antenna elements are mutually exclusive.

44. The system of claim 43, wherein the first partition of antenna elements are adjacent to the second partition of antenna elements, and the second partition of antenna elements are adjacent to the third partition of antenna elements.

45. The system of claim 43, wherein the second partition of antenna elements is arranged relative to the third partition of antenna elements along a perimeter of the first partition of antenna elements.

46. The system of claim 43, wherein the second partition of antenna elements and the third partition of antenna elements each partially surround a perimeter of the first partition of antenna elements.

47. The system of claim 15, wherein a perimeter of the first partition of antenna elements is completely surrounded by other partitions of antenna elements.

* * * * *